United States Patent
Yamada

[19]

[11] Patent Number: 5,955,967
[45] Date of Patent: Sep. 21, 1999

[54] SCAN-TYPE RADAR APPARATUS FOR A VEHICLE TO ACCURATELY DETECT AN OBJECT IN A LANE OF THE RADAR EQUIPPED VEHICLE

[75] Inventor: Yukinori Yamada, Susono, Japan

[73] Assignee: Toyota Jidosha Kabushiki Kaisha, Toyota, Japan

[21] Appl. No.: 08/755,025

[22] Filed: Nov. 22, 1996

[30] Foreign Application Priority Data

Nov. 24, 1995 [JP] Japan .................................. 7-306280
Aug. 12, 1996 [JP] Japan .................................. 8-212812

[51] Int. Cl.$^6$ ........................................................ G08G 1/00
[52] U.S. Cl. .......................... 340/904; 340/435; 340/436; 340/901; 340/903; 342/70; 367/909; 180/169; 180/271; 701/300; 701/301; 701/96
[58] Field of Search .................................... 340/435, 436, 340/901, 903, 904; 342/70, 71, 72; 367/909, 112, 96, 97, 107; 180/167, 168, 169, 170, 271; 364/460, 461, 426.04; 701/300, 301, 96

[56] References Cited

U.S. PATENT DOCUMENTS

| | | | |
|---|---|---|---|
| 4,146,891 | 3/1979 | Fujiki et al. | 343/7 UM |
| 4,632,543 | 12/1986 | Endo | 180/167 |
| 4,703,429 | 10/1987 | Sakata . | |
| 4,727,492 | 2/1988 | Reeve et al. | 180/169 |
| 4,757,450 | 7/1988 | Etoh | 364/461 |
| 4,833,469 | 5/1989 | David | 340/903 |
| 5,227,784 | 7/1993 | Masamori et al. | 340/903 |
| 5,249,157 | 9/1993 | Taylor | 340/903 |
| 5,450,057 | 9/1995 | Watanabe | 340/435 |
| 5,461,357 | 10/1995 | Yoshika et al. | 340/435 |
| 5,555,312 | 9/1996 | Shima et al. | 364/461 |
| 5,572,428 | 11/1996 | Ishida et al. | 340/903 |
| 5,574,463 | 11/1996 | Shirai et al. | 342/70 |
| 5,633,642 | 5/1997 | Hoss et al. | 342/70 |

FOREIGN PATENT DOCUMENTS

| | | |
|---|---|---|
| 4-248489 | 9/1992 | Japan . |
| 5-205198 | 8/1993 | Japan . |
| 6-150195 | 5/1994 | Japan . |

OTHER PUBLICATIONS

Eriksson L.H., et al, "A High Performance Automotive Radar for Automatic AICC" International Radar Conference, IEEE Alexandria, May 8–11, 1995, pp. 380–385.

European Search Report, dated Aug. 6, 1998.

Primary Examiner—Nina Tong
Attorney, Agent, or Firm—Pillsbury Madison & Sutro LLP

[57] ABSTRACT

A scan-type radar apparatus for a vehicle which determines whether an object detected by the radar exists in the lane in which the radar equipped vehicle is moving with a high accuracy while restricting an increase of the manufacturing cost of the radar apparatus. A scan-type radar detects objects existing in a detectable range, the scan-type radar apparatus assuming a vehicle moving lane area corresponding to a vehicle moving lane in which the vehicle is moving based on an operating condition of the vehicle, the vehicle moving lane area being assumed within the detectable range. An actual direction of each of the objects is detected by the scan-type radar with respect to the radar equipped vehicle. A delay direction is calculated when the actual direction detected by an object direction detecting arrangement is changed with respect to time, the delay direction indicating a direction of a virtual position of each object with respect to the vehicle by being provided with a predetermined time delay with respect to a change in the actual direction. It is determined whether each object exists within the vehicle moving lane based on the delay direction.

8 Claims, 20 Drawing Sheets

SCAN-TYPE RADAR APPARATUS FOR A VEHICLE TO ACCURATELY DETECT AN OBJECT IN A LANE OF THE RADAR EQUIPPED VEHICLE

BACKGROUND OF THE INVENTION

1. Field of the Invention

The present invention relates to a scan-type radar provided on a vehicle and, more particularly, to a scan-type radar apparatus which detects an object existing in a lane in which the radar equipped vehicle is moving.

2. Description of the Related Art

Conventionally, a radar apparatus for a vehicle which detects an object anterior to the radar equipped vehicle is known, for example, in Japanese Laid-open Patent Application No.6-150195. This conventional radar apparatus comprises a radar which is capable of detecting the positions and orientations of a plurality of objects existing in a wide area anterior to the radar equipped vehicle. According to such a radar apparatus, a relative position of each of the objects existing in the detectable range with respect to the radar equipped vehicle can be detected.

In order to utilize the results of the radar apparatus for the control of a vehicle operation, it is required to accurately determine whether the objects detected by the radar apparatus exist in the lane in which the radar equipped vehicle is moving. Hereinafter, the lane in which the radar equipped vehicle is moving may be referred to as a radar equipped vehicle moving lane. When the radar equipped vehicle is moving in a straight line, it can be assumed that the radar equipped vehicle moving lane extends forwardly of the radar equipped vehicle and has a predetermined lane width. Accordingly, in such a case, an area corresponding to the radar equipped vehicle moving lane can be accurately recognized within the detectable range of the radar apparatus. When the radar equipped vehicle moves along a curve, it can be assumed that the radar equipped vehicle moving lane extends forwardly of the radar equipped vehicle in accordance with the radius of curvature of the curve. Accordingly, if the radius of curvature is known, the area corresponding to the radar equipped vehicle moving lane can be recognized in the detectable range of the radar apparatus.

In the above-mentioned conventional radar apparatus having a wide detectable range in the anterior of the radar equipped vehicle, an object existing in the radar equipped vehicle moving lane can be detected in the detectable range whether the radar equipped vehicle is moving on a straight road or a curved road. The radius of curvature of a road on which the radar equipped vehicle is moving can be assumed based on an operating condition of the vehicle such as a yaw rate $w_y$. Accordingly, in the above-mentioned conventional apparatus, a lane area of the radar equipped vehicle can be recognized in response to the operating condition of the vehicle. Thus, an object which is not in the radar equipped vehicle moving lane can be distinguished from an object in the radar equipped vehicle moving lane, when the object is detected by the radar apparatus, by determining whether or not the object is in the recognized lane area.

If an object detected by the radar apparatus is a vehicle moving anterior to the radar equipped vehicle, the object vehicle enters a curve before the radar equipped vehicle enters the curve. Accordingly, in the method in which the lane area is determined by assuming the radius of curvature based on the operating condition, an object in the radar equipped vehicle moving lane may be erroneously recognized as one which is not in the radar equipped vehicle moving lane during the period from the time when the object, such as a vehicle moving anterior to the radar equipped vehicle, enters a curve to the time when the radar equipped vehicle enters the curve.

The above-mentioned problem may be eliminated by setting a lane area having a greater width in the detectable range. Alternatively, the problem can be eliminated by detecting the radius of curvature of the road extending in an anterior direction of the radar equipped vehicle by using an image recognizing apparatus. However, the former method may decrease the accuracy of discrimination between objects existing and not existing in the radar equipped vehicle moving lane. The later method may increase manufacturing cost of the radar apparatus. As mentioned above, in the conventional radar apparatus, it is difficult to provide a radar detection function which accurately discriminate between an object existing in the radar equipped vehicle moving lane and an object which is not existent in the radar equipped vehicle moving lane, at a low manufacturing cost.

SUMMARY OF THE INVENTION

It is a general object of the present invention to provide an improved and useful radar apparatus for a vehicle in which the above-mentioned problems are eliminated.

A more specific object of the present invention is to provide a scan-type radar apparatus for a vehicle which determines, with high accuracy, whether an object detected by the radar exists in the lane in which the radar equipped vehicle is moving while restricting an increase of the manufacturing cost of the radar apparatus.

In order to achieve the above-mentioned object, there is provided according to the present invention a scan-type radar apparatus provided on a vehicle, comprising:

a scan-type radar for detecting objects existing in a detectable range, the scan-type radar apparatus assuming a vehicle moving lane area corresponding to a vehicle moving lane in which the vehicle is moving based on an operating condition of the vehicle, the vehicle moving lane area being assumed within the detectable range;

object direction detecting means for detecting an actual direction of each of the objects detected by the scan-type radar with respect to the vehicle;

delay direction calculating means for calculating a delay direction when the actual direction detected by the object direction detecting means is changed with respect to time, the delay direction indicating a direction of a virtual position of each of the objects with respect to the vehicle by being provided with a predetermined time delay with respect to a change in the actual direction; and existence determining means for determining whether each object exists within the vehicle moving lane based on the delay direction.

According to the above-mentioned invention, the scan-type radar detects the object existing in the detectable range to generate data corresponding to each of the objects. The direction of each of the object is calculated based on the data generated by the scan-type radar. The direction of an object detected by the radar is shifted in a transverse direction when the object enters into or exits from a curve prior to the radar equipped vehicle. When such shift occurs, the delay direction is calculated which is provided with the predetermined time delay. The delay direction is shifted slower than the actual direction of the object due to the time delay being provided thereto. Thus, the virtual position of the vehicle indicated by the delay direction remains within the vehicle moving lane area immediately after the object enters or exits a curve. After the radar equipped vehicle following the object enters or exits the curve, the vehicle moving lane area assumed by the radar apparatus is corrected to an appropriate area in which the object actually exists. Thus, the position of the object indicated by the delay direction always exists within the assumed vehicle moving lane area.

In the present invention, the delay direction calculating means may comprise a blunted value calculating means for calculating a blunted value of the actual direction as the delay direction. In one embodiment of the present invention, the blunted value is obtained from the actual direction being processed by a digital filtering method. The blunted value shows a relatively gentle and smooth change as compared to the delay direction directly obtained from the actual direction. Thus, an accurate determination can be performed when a radius of curvature of a road fluctuates. Additionally, a chattering generated in the control of the radar apparatus due to small fluctuations of the direction can be prevented.

The scan-type radar apparatus according to the present invention may further comprise change rate detecting means for detecting a change rate of the actual direction of each of the objects, wherein the existence determining means comprises lane width changing means for decreasing a width of the vehicle moving lane area when the change rate exceeds a predetermined value.

According to this invention, the change rate is detected when the direction of the object is shifted. The change rate of the direction when the object enters into or exits form a curve is smaller that the change rate when the object moves from the vehicle moving lane to another lane. Thus, an object changing a lane can be immediately excluded from the objects determined to be existent in the vehicle moving lane by decreasing the width of the vehicle moving lane.

Additionally, in the scan-type radar apparatus according to the present invention, the delay direction calculating means may comprise delay amount setting means for providing the predetermined time delay to each of the objects detected by the scan-type radar.

In this invention, if the predetermined time delay is set to a large value, that is, if the amount of delay of the delay direction with respect to the actual direction of the object is large, the possibility of an erroneous determination that the object in the vehicle moving lane is determined as an object existing in other lanes is decreased.

Additionally, the scan-type radar apparatus according to the present invention may further comprise correspondence determining means for determining whether the change in the actual direction of each of the objects corresponds to each other, wherein the existence determining means comprises determination maintaining means for determining that one of the objects continuously exists in the vehicle moving lane when a shift in the actual direction of the one of the objects which has been determined to exist in the vehicle moving lane corresponds to a shift in the actual direction of at least another one of the objects.

When a plurality of objects ahead of the radar equipped vehicle enters or exits a curve, the positions of the objects show similar movement with respect to the radar equipped vehicle. That is, when the shift in the directions of the objects correspond to each other, it is determined that the objects entered into or exited from a curve prior to the radar equipped vehicle. Thus, in this invention, if the shift in the direction of one of the objects, existing in the vehicle moving lane, corresponds to the shift in the direction of other objects, the one of the objects is determined to be continuously existing in the vehicle moving lane.

Additionally, in the scan-type radar apparatus according to the present invention, the correspondence determining means comprises time difference assuming means for assuming a time difference between a start time of a shift in the direction of the objects based on each distance between the objects.

When a plurality of objects enter into or exit from a curve, a shift in the direction of the most remote object is detected first. The start time of the shift in the direction of each object is detected sequentially when each object enters into or exits from a curve. Accordingly, there are time differences between the times when the shift of the direction of each object is detected. Thus, if the shift in the direction of each of a plurality of objects is detected with time differences corresponding to the distances between the objects, it is determined that the objects entered into or exited from a curve. In this invention, the correspondence of movement of a plurality of objects is determined by considering such time differences.

Additionally, the scan-type radar apparatus according to the present invention further comprise excluding means for excluding a short distance object from the objects determined to exist in said vehicle moving lane when a shift in the actual direction of the short distance object has a change rate greater than a predetermined value for a predetermined time period, the short distance object being one of the objects positioned within a predetermined short distance from the vehicle in the vehicle moving lane.

In this invention, the short distance object whose direction is continuously subjected to large shift for the predetermined time period is excluded from the objects determined to exist in the vehicle moving lane. Accordingly, the short distance object is not subjected to the determination based on the delay direction, and is immediately excluded from the objects determined to exist in the vehicle moving lane.

Additionally, the scan-type radar apparatus according to the present invention further comprises recognizing means for recognizing a long distance object as an object existing in the vehicle moving lane during a first predetermined time period, after a change has occurred in the actual direction of the long distance object with a continuous change rate of more than a predetermined value for a second predetermined time period, the long distance object being positioned beyond a predetermined long distance from the vehicle.

When the direction of the long distance object shows a large shift for a predetermined time period, it is determined that the long distance object entered or exited a curve or changed a lane. It takes a relatively long time for the radar equipped vehicle to enter or exit the curve after the long distance object entered or exited the curve. Thus, unlike the short distance object or the middle distance object, the delay direction of the long distance object which is determined to exist in the vehicle moving lane may be shifted out of the vehicle moving lane area. This results in the exclusion of the long distance object from the object determined to exist in the vehicle moving lane. However, in this invention, the long distance object is not subjected to the determination based on the delay direction, and the long distance object is continuously determined to exist in the vehicle moving lane for a predetermined time period after the shift in the direction of the long distance object was detected. If the shift in the direction is caused by a change of lane, the delay direction will not return to the vehicle moving lane. Thus, the long distance object is excluded from the objects determined to exist in the vehicle moving lane at that time. If the shift in the direction is caused by the curve, the delay direction will return to the vehicle moving lane area within the predetermined time period. In this case, the long distance object is appropriately recognized as the object which is existent in the vehicle moving lane.

Other objects, features and advantages of the present invention will become more apparent from the following detailed description when read in conjunction with the accompanying drawings.

DETAILED DESCRIPTION OF THE PREFERRED EMBODIMENTS

Figure 1:
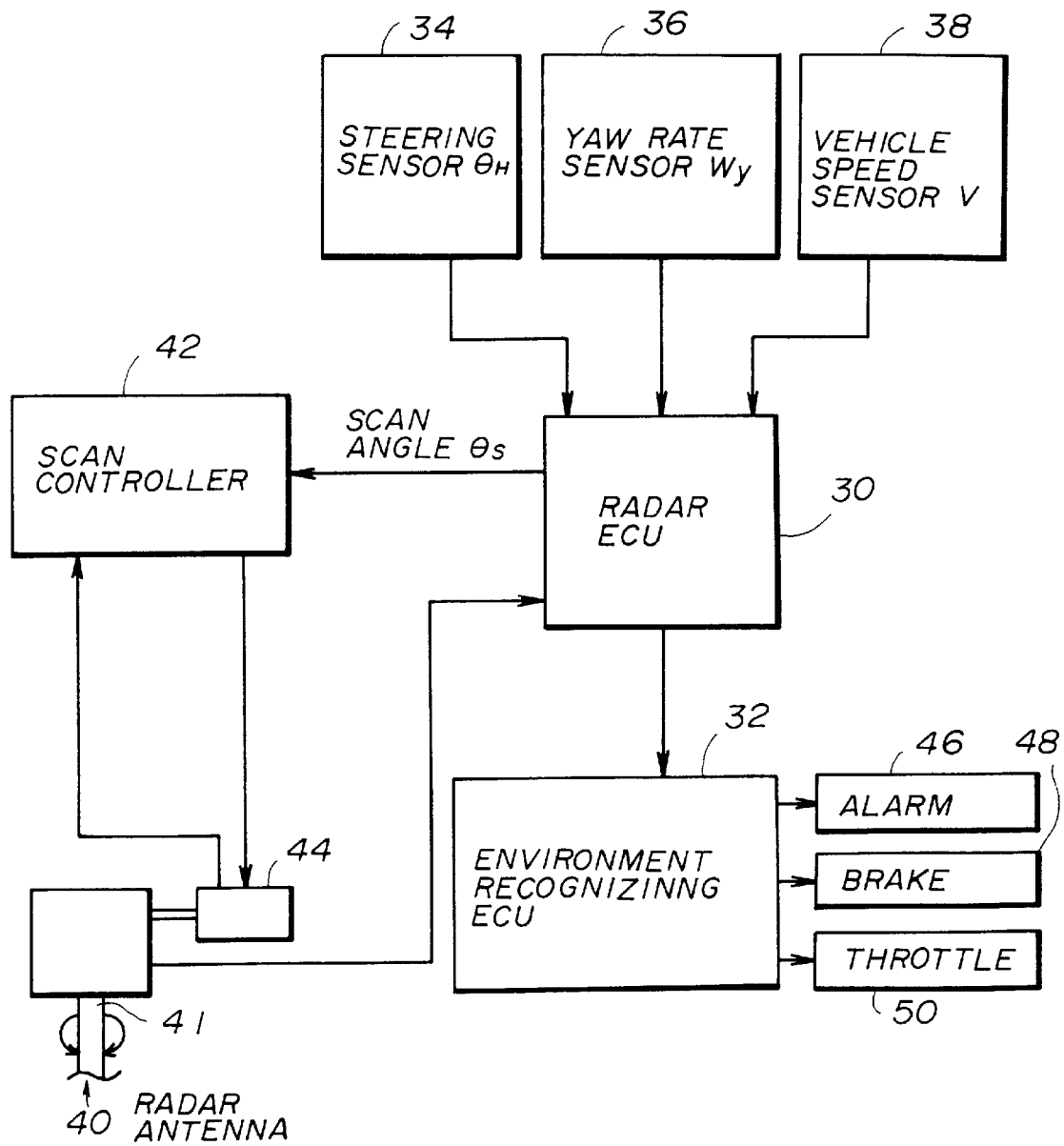
FIG. 1 is a block diagram of a scan-type radar apparatus for a vehicle according to a first embodiment of the present invention.

A description will now be given of a first embodiment of the present invention. FIG. 1 is a block diagram of a scan-type radar apparatus (may be referred to as simply a radar apparatus) for a vehicle according to the first embodiment of the present invention. The radar apparatus according to the first embodiment of the present invention is controlled by an electronic control unit 30 (hereinafter referred to as a radar ECU 30) for controlling the radar and an electronic control unit 32 (hereinafter referred to as a environment recognizing ECU 32) for controlling vehicle speed by recognizing an operating environment of a vehicle.

The radar ECU 30 is connected with a steering angle sensor 34, a yaw rate sensor 36 and a vehicle speed sensor 38. The steering angle sensor 34 generates a signal (steering angle signal $\theta_H$) corresponding to the steering angle of a steering wheel. The yaw rate sensor 36 generates a signal (yaw rate signal $w_y$) corresponding to the angular velocity of the vehicle with respect to the center of gravity thereof. The vehicle speed sensor 38 generates a pulse signal (vehicle speed signal V) having a pulse period which varies in response to vehicle speed.

The radar ECU 30 assumes a turning radius R of the vehicle based on the steering angle signal $\theta_H$, the yaw rate signal $w_y$ and the vehicle speed signal V. The turning radius R can be calculated based on one of the steering angle signal $\theta_H$ and the yaw rate signal $w_y$. Thus, both the steering angle sensor 34 and the yaw rate sensor 36 are not needed as the turning radius can be calculated by using one of the sensors.

The radar ECU 30 is connected with a radar antenna 40 and a scan controller 42. The radar antenna 40 is provided adjacent to the front grille of the vehicle and is pivotable with respect to a pivot axis extending in a vertical direction. The radar antenna 40 has a directivity to transmit and receive a signal with a predetermined beam spreading angle.

The radar antenna 40 is coupled to a scan mechanism 44 which swings the radar antenna 40. The scan mechanism 44 is feedback controlled by the scan controller 42. A scan angle signal is supplied to the scan controller 42 from the radar ECU 30. The scan controller 42 feedback controls the scan mechanism 44 so that the scan angle of the radar antenna 40 corresponds to a designating angle $\theta_S$ supplied by the radar ECU 30. The radar ECU 30 varies the designating angle $\theta_S$ at a predetermined period so that the detectable range anterior to the vehicle is scanned by the radar antenna 40.

The radar ECU 30 constitutes, together with the radar antenna 40, a known Frequency Modulation-Continuous Wave radar (FM-CW radar). That is, the radar ECU 30 controls the radar antenna 40 to transmit a predetermined transmission wave therefrom. The ECU 30 detects data of a relative distance RD and a relative velocity RV with respect to an object existing anterior to the radar equipped vehicle in a direction of designating angle (scan angle $\theta_S$) based on a reflection wave received by the radar antenna 40. The radar ECU 30 detects a state of the object in the detectable range based on the data, and sends the result of detection to the environment recognition ECU 32.

The environment recognizing ECU 32 is connected with an alarm 46, a brake 48 and a throttle 50. The environment recognizing ECU 32 controls the alarm 46 and a brake 48 or throttle 50 to decelerate the vehicle and draw the driver's attention, when an object anterior to the vehicle gets close to the vehicle, in accordance with a predetermined logic.

Figure 2:
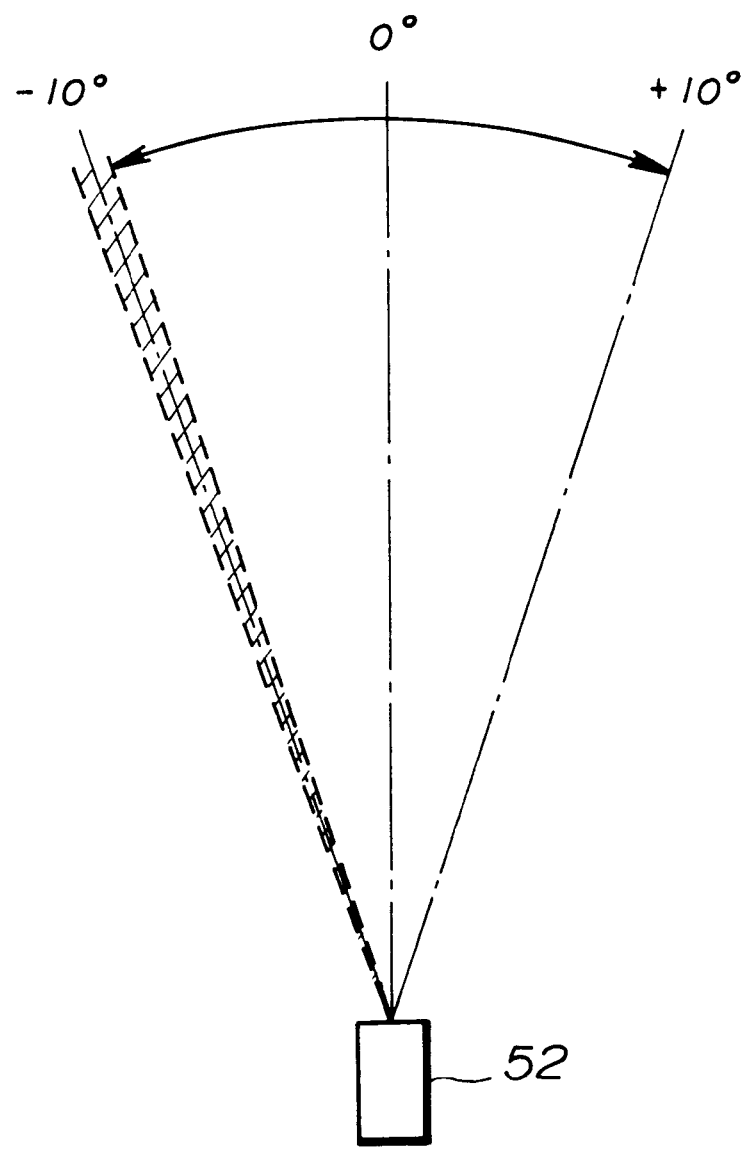
FIG. 2 is an illustration of a scanning area of the radar apparatus shown in FIG. 1.

FIG. 2 is an illustration of a scanning area of the radar apparatus according to the present embodiment. In FIG. 2, a vehicle 52 is equipped with the radar apparatus having the radar 40 shown in FIG. 1. In the present embodiment, the scanning area of the radar 40, which corresponds to the detectable range for an object, is a range extending anterior to the vehicle 52 at an angle of 10 degrees with respect to the longitudinal axis of the vehicle 52 to both the left and right side of the vehicle 52. Hereinafter, the area on the left side is assumed to be an area with a negative scan angle $\theta_S$, and the area on the right side is assumed to be an area with a positive scan angle $\theta_S$.

In the present embodiment, the radar antenna 40 is controlled to scan from −10 degrees to +10 degrees for every 100 msec. Additionally, the radar ECU 30 detects data of an object for each 0.5 degrees of the scan angle $\theta_S$ when the radar antenna 40 scans the area shown in FIG. 2. That is, in the present embodiment, the detectable range is divided into 40 areas with 0.5 degrees interval. Thus, 40 sets of data is obtained when the radar antenna 40 scans the detectable range between −10 degrees and +10 degrees of the scan angle $\theta_S$.

Figure 3:
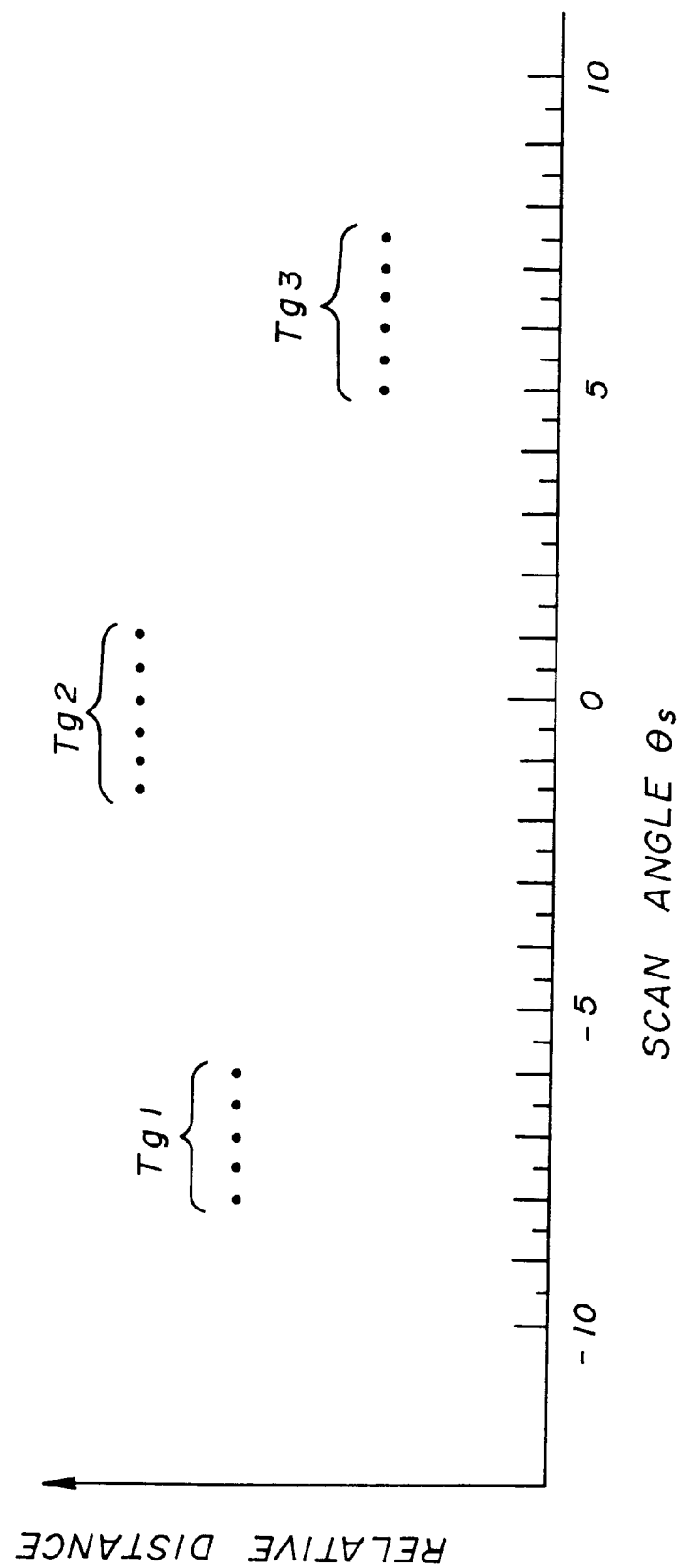
FIG. 3 is an illustration of sets of data with respect to objects (targets) detected by a radar ECU shown in FIG. 1.

FIG. 3 is an illustration of sets of data with respect to objects (targets) detected by the radar ECU 30. The sets of data in FIG. 3 indicate the corresponding scan angle $\theta_S$ and the relative distance between each of the objects and the radar equipped vehicle 52. In FIG. 2, there are three targets Tg1 to Tg3. The target Tg1 is detected at an angular position corresponding to the scan angle $\theta_S$ ranging from −8 degrees to −6 degrees. The target Tg2 is detected at an angular position corresponding to the scan angle $\theta_S$ ranging from −1.5 degrees to +1 degree. The target Tg3 is detected at an angular position corresponding to the scan angle $\theta_S$ ranging from +5 degrees to +7.5 degrees.

In the radar apparatus according to the present embodiment, the alarm 46, the brake 48 and the throttle 50 must be operated when an object is positioned close to the vehicle 52 in the lane (hereinafter referred to as a vehicle moving lane) in which the vehicle 52 is moving. In order to achieve such a function, it must be determined whether or not an object is in the vehicle moving lane based on the sets of data of the objects as shown in FIG. 3. Additionally, when it is determined that an object is in the vehicle moving lane, the alarm 46, the brake 48 and the throttle 50 must be controlled based on the relative distance RD and the relative velocity RV of the vehicle in the vehicle moving lane.

In the present embodiment, after the distribution of the objects as shown in FIG. 3 is obtained, sets of data indicating an angular position close to each other are grouped, each of the groups of sets of data indicates a single object. Then, the center angle of the scan angles corresponding to each of the grouped sets of data is calculated for each of the grouped sets of data. Hereinafter, the center angle of each group of sets of data is referred to as an actual center angle $\theta_{cent}$r. It is determined whether or not an object is in the vehicle moving lane based on the determination as to whether or not the actual center angle $\theta_{cent}$r is positioned within the vehicle moving lane.

Figure 4:
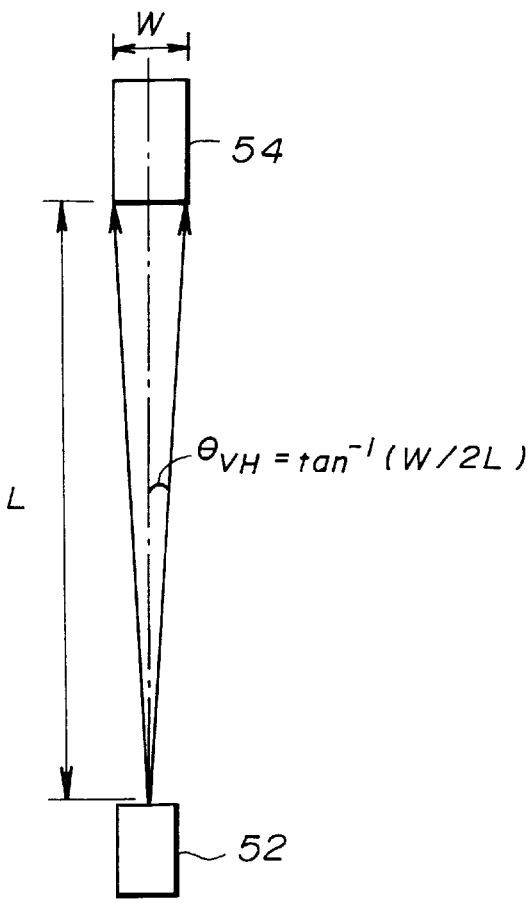
FIG. 4 is an illustration of an object and a radar equipped vehicle moving in the same lane.

FIG. 4 is an illustration of an object 54 and the vehicle 52 moving in the same lane. The object 54, which is, for example, a vehicle anterior to the radar equipped vehicle 52, is spaced from the radar equipped vehicle 52 with a distance L. The longitudinal axis of the object 54 aligns with the longitudinal axis of the vehicle 52. In the state shown in FIG. 4, the range of the scan angle $\theta_S$ at which the anterior object 54 is irradiated by the radar beam of the radar antenna 40 can be represented by the following relationship (1), where W is a width of the object 54.

$$-\tan^{-1}(W/2L) \leq \theta_S \leq \tan^{-1}(W/2L) \tag{1}$$

The above relationship (1) can be represented by the following relationship (2), where $\theta_{VH}$ is an irradiatable scan angle corresponding to the term "$\tan^{-1}(W/2L)$" of the relationship.

$$-\theta_{VH} \leq \theta_S \leq \theta_{VH} \tag{2}$$

If all of the sets of data with respect to the object 54 are obtained properly, the actual center angle $\theta_{cent}$r becomes zero degrees. However, in a practical condition, the actual center angle $\theta_{cent}$r does not always become zero degrees. That is, the actual center angle $\theta_{cent}$r can possibly vary within the range from $-\theta_{VH}$ to $\theta_{VH}$.

The object 54, which is a vehicle moving anterior to the vehicle 52, may move leftwardly or rightwardly within the width of the vehicle moving lane. Considering such movement, the actual center angle $\theta_{cent}$r can possibly vary within a range slightly wider than the range from $-\theta_{VH}$ to $\theta_{VH}$. Accordingly, in the present embodiment, it is determined that the object 54 and the radar equipped vehicle 52 are in the same lane in a straight road when the following relationship (3) is satisfied, where K is a correction factor. In the present embodiment, the correction factor K is set to 1.1 (K=1.1).

$$-K \cdot \theta_{VH} \leq \theta_{cent}r \leq K \cdot \theta_{VH} \tag{3}$$

Figure 5:
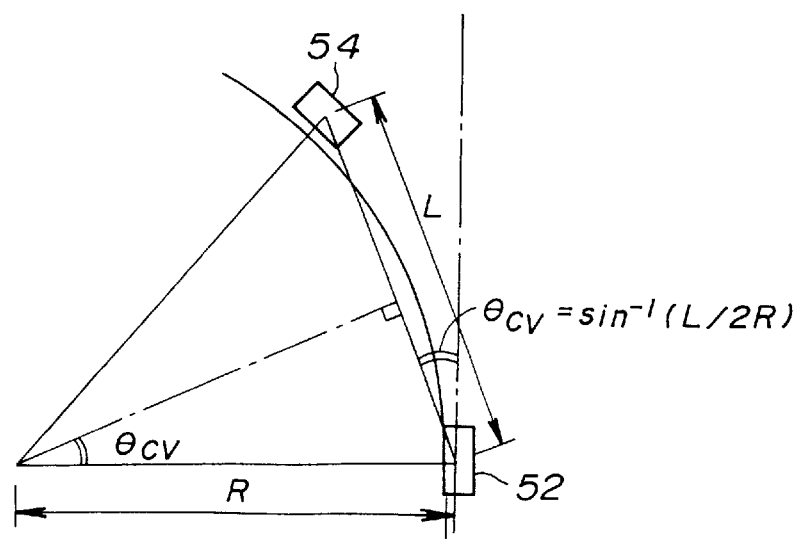
FIG. 5 is an illustration of a state where the object and the vehicle are in the same curved lane.

FIG. 5 is an illustration of a state where the object 54 and the vehicle 52 are in the same curved lane having a radius of curvature R and the distance between the object 54 and the vehicle 52 is maintained at the distance L. When the object 54 and the radar equipped vehicle 52 are moving in the curve, a direction $\theta_{CV}$ of the object 54 with respect to the vehicle 52 varies in response to the radius of curvature R. In this case, as shown in FIG. 5, the direction $\theta_{CV}$, which is an angle between the longitudinal axis of the vehicle 52 and a line connecting the object 54 and the vehicle 52, can be represented as $\theta_{CV}=\sin^{-1}(L/2R)$. Accordingly, under such a condition, the actual center angle $\theta_{cent}$r of the object 54 moving in the same lane varies from the actual center angle $\theta_{CV}$ of a straight lane toward the center of the curve by the angle $\theta_{CV}$. In this case, it is assumed that the object 54 is in the same lane if the following relationship (4) is satisfied.

$$\theta_{CV} - K \cdot \theta_{VH} < \theta_{cent}r < \theta_{CV} + K \cdot \theta_{VH} \tag{4}$$

A straight road is considered to be a curve having an infinite radius of curvature. In this sense, it can be determined whether or not the radar equipped vehicle 52 and the object 54 are in the same lane based on the above-mentioned relationship (4) when the object 52 and the vehicle 54 are moving in a curve as well as in a straight lane.

The radius of curvature R of the road on which the object 54 is moving can be assumed to be equal to the turning radius of the vehicle 52. In the present embodiment, as mentioned above, the radar ECU 30 functions to detect the turning radius Rt of the vehicle 52. Thus, the relationship (4) can be established based on the turning radius Rt calculated by the radar ECU 30 so as to determined whether the detected actual center angle $\theta_{cent}r$ satisfies the relationship (4). In this manner, it can be determined with high accuracy whether the object 54 and the vehicle 52 are moving in the same lane when both the object 54 and the vehicle 52 are on a straight road and also when they are on a curved road.

However, according to the above-mentioned manner, the turning radius Rt of the radar equipped vehicle 52 is assumed to be infinite while the radius of curvature R of the lane between the object 54 and the vehicle 52 is varied during the period from the time when the object 54 enters a curve to the time when the radar equipped vehicle 52 enters the curve. Additionally, the turning radius Rt of the radar equipped vehicle 52 is maintained to be the radius of curvature R of the curve while the radius of curvature R of the lane between the object 54 and the vehicle 52 is varied toward an infinite radius during the period from the time when the object 54 exits a curve to the time when the radar equipped vehicle 52 exits the curve.

When the radius of curvature of the lane between the object 54 and the vehicle 52 does not accurately match the turning radius Rt calculated in the radar equipped vehicle 52, the condition which is satisfied by the actual center angle $\theta_{cent}r$ differs from the condition where the above-mentioned relationship (4) is satisfied. Thus, there is a possibility that the object 52 in the lane of the vehicle 52 is erroneously determined to be an object which is not in the lane of the radar equipped vehicle 52.

Figure 6:
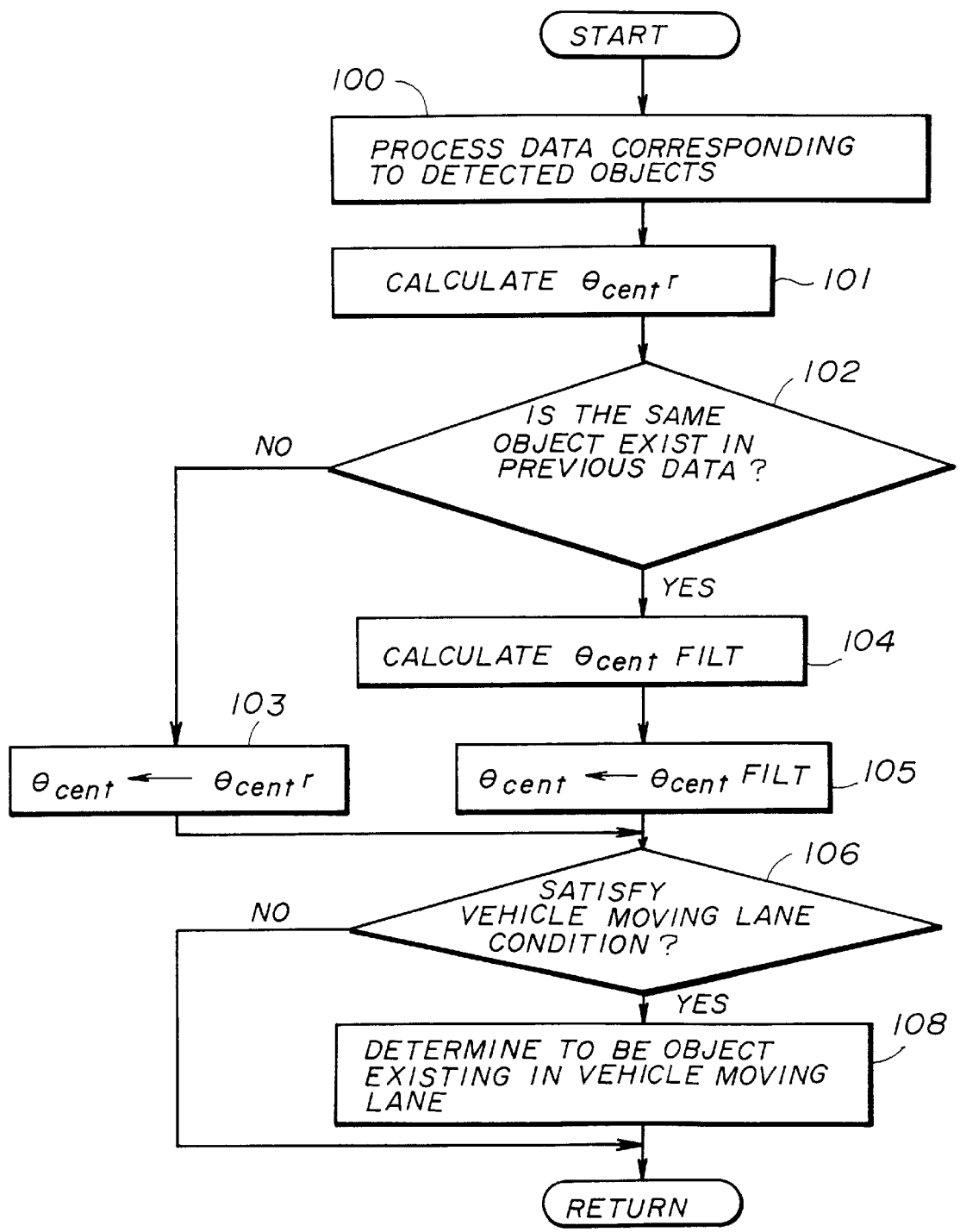
FIG. 6 is a flowchart of a control routine performed by a radar ECU shown in FIG. 1.

In the present embodiment, an object in the radar equipped vehicle moving lane is accurately discriminated from objects which are not in the radar equipped vehicle moving lane without having the above-mentioned erroneous determination at the time when the radar equipped vehicle enters or exits a curve. FIG. 6 is a flowchart of a control routine performed by the radar ECU 30 to achieve the above-mentioned feature of the present embodiment. The routine shown in FIG. 6 is started every time the scanning operation is performed by the radar antenna 40 from −10 degrees to +10 degrees of the scan angle $\theta_S$, that is, the routine is started for each 100 msec.

When the routine shown in FIG. 6 is started, the data with respect to objects detected by the scanning of the radar antenna 40 is processed in step 100. In this step, sets of data each of which are supposed to be derived from a single object is grouped from among all sets of data. Additionally, the relative distance and the relative velocity of each of the objects recognized by the grouping of the data are calculated. Then, in step 101, the actual center angle $\theta_{cent}r$ of each of the recognized objects is calculated based on the grouped sets of data.

In step 102, it is determined whether or not the object detected at this time was detected in the previous time. It should be noted that when a plurality of objects are detected at this time, the determination is made for each of the objects. As a result, it is determined that the objects for which no corresponding data exists in the previous data is determined to be a new object which has entered in the detectable range of the radar. The actual center angle $\theta_{cent}r$ of the object determined as the object in the detectable range is stored as the center angle of the object in step 103. Then, the routine proceeds to step 106.

More specifically, if it is determined, in step 102, that the object was detected in the previous scanning cycle, the routine proceeds to step 104. In step 104, a blunted value $\theta_{cent}FILT$ is calculated with respect to the actual central angle $\theta_{cent}r$. The normalized value $\theta_{cent}FILT$ is calculated by substituting the three most recent actual center angle $\theta_{cent}r$ ($\theta_{cent}r(n)$, $\theta_{cent}r(n-1)$ and $\theta_{cent}r(n-2)$) and the two most recent delay directions $\theta_{cent}FILT$ ($\theta_{cent}FILT(n-1)$ and $\theta_{cent}FILT(n-2)$ into the following expression (5).

$$\theta_{cent} = k1 \cdot \theta_{cent}r(n) + k2 \cdot \theta_{cent}r(n-1) + \\ k3 \cdot \theta_{cent}r(n-2) + k4 \cdot \theta_{cent}FILT(n-1) + k5 \cdot \theta_{cent}FILT(n-2) \quad (5)$$

The above-mentioned expression (5) is a calculation formula for forming a digital low-pass filter. In the expression (5), the constants k1 to k5 are provided for determining the cut-off frequency of a filter. In this embodiment, values of the constants k1 to k5 are set so that the cut-off frequency becomes 0.25 Hz.

After the process of step 104 is completed, the routine proceeds to step 105. In step 105, the delay direction $\theta_{cent}FILT$ is stored as an object center angle $\theta_{cent}$, and the routine proceeds to step 106.

Figure 7A:
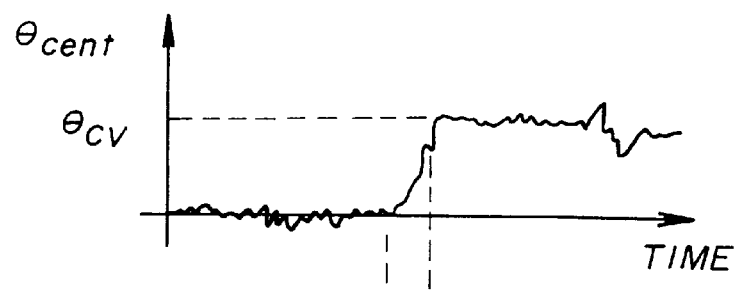
FIG. 7A is a graph showing a variation of an actual center angle $\theta_{cent}r$ when an object and a radar equipped vehicle enters a curve.

FIG. 7A is a graph showing a variation of the actual center angle $\theta_{cent}r$ when an object moving in the radar equipped vehicle moving lane enters a curve at time t1 and then the radar equipped vehicle 52 enters the curve at time t2. As shown in FIG. 7A, the actual center angle $\theta_{cent}r$ is maintained constant until the time t1 is reached. The actual center angle $\theta_{cent}r$ is varied from the time t1 to the time t2. Then, after the time t1 is passed, the actual center angle $\theta_{cent}r$ is maintained to be close to the angle $\theta_{CV}$ which is determined by the radius of curvature R of the curve and the distance between the object and the radar equipped vehicle.

Figure 7B:
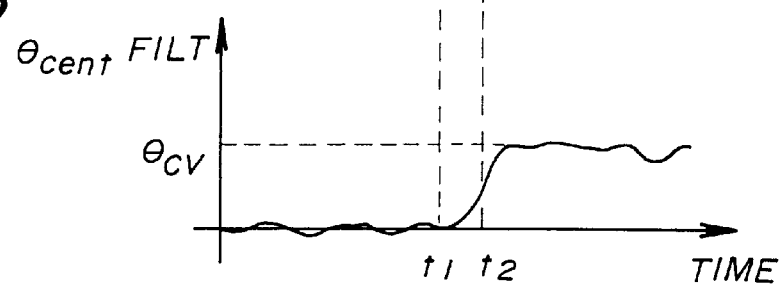
FIG. 7B is a graph showing a variation of a delay direction $\theta_{cent}FILT$ corresponding to the variation of the actual center angle $\theta_{cent}r$ shown in FIG. 7A.

FIG. 7B is a graph showing a variation of the delay direction $\theta_{cent}FILT$ corresponding to the variation of the actual center angle $\theta_{cent}r$ shown in FIG. 7A. As shown in FIG. 7B, the variation of the delay direction $\theta_{cent}FILT$ is gentle and smooth as compared to the variation of the actual center angle $\theta_{cent}r$, and varies to follow the actual center angle $\theta_{cent}r$ from the time t1 with a slight delay with respect to the variation of the actual center angle $\theta_{cent}r$.

Figure 8:
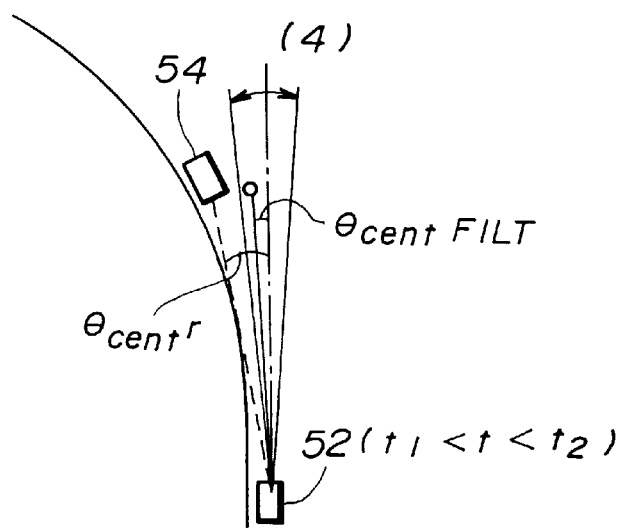
FIG. 8 is an illustration for explaining a relationship between the actual center angle $\theta_{cent}r$ and the delay direction $\theta_{cent}FILT$ when the object enters a curve.

FIG. 8 is an illustration for explaining a relationship between the actual center angle $\theta_{cent}r$ and the delay direction $\theta_{cent}FILT$ established during a period from the time t1 to the time t2. In FIG. 8, a vehicle moving lane area indicated by the reference numeral (4) corresponds to the vehicle moving lane recognized by the radar equipped vehicle 52. As discussed above, the delay direction $\theta_{cent}FILT$ varies slightly later than the variation of the actual center angle $\theta_{cent}r$. Thus, when the object 54 indicated by the actual center angle $\theta_{cent}r$ exits the vehicle moving lane due to the object entering a curve, the delay direction $\theta_{cent}FILT$ still remains in the range of the vehicle moving lane.

Figure 9:
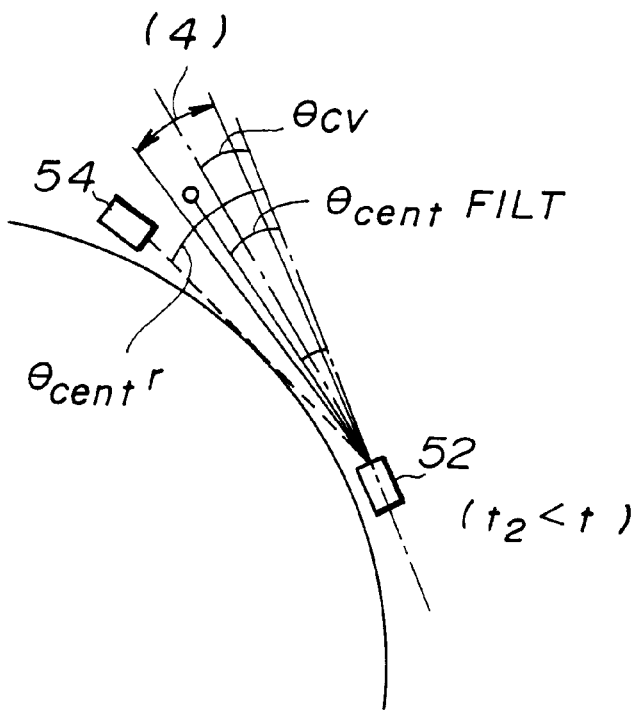
FIG. 9 is an illustration for explaining a relationship between the actual center angle $\theta_{cent}r$ and the delay direction $\theta_{cent}FILT$ established when both the object and the radar equipped vehicle are in the same curve.

FIG. 9 is an illustration for explaining a relationship between the actual center angle $\theta_{cent}r$ and the delay direction $\theta_{cent}FILT$ established after the time t2 and until the object 54 exits the curve. That is, the relationship shown in FIG. 9 is established when both the object 54 and the radar equipped vehicle 52 are moving in the same curve. After the time t1, the delay direction $\theta_{cent}FILT$ is gradually varied toward a direction in which the difference between the actual center angle $\theta_{cent}r$ and the delay direction $\theta_{cent}FILT$ is decreased. On the other hand, the vehicle moving lane area (4) is shifted toward the turning direction of the vehicle 52 due to the turning motion of the vehicle 52 after the vehicle 52 enters the curve. As a result, the delay direction $\theta_{cent}FILT$ remains in the vehicle moving lane area (4) recognized by the radar equipped vehicle 52.

Figure 10:
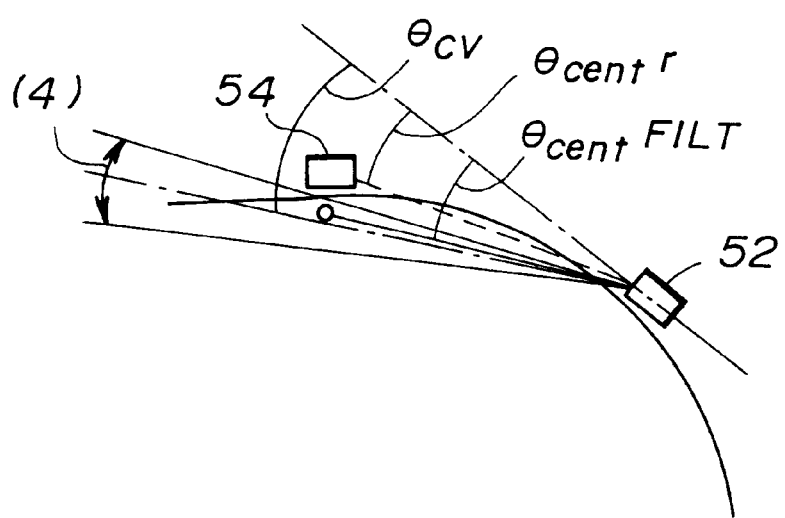
FIG. 10 is an illustration for explaining a relationship between the actual center angle $\theta_{cent}r$ and the delay direction $\theta_{cent}FILT$ established immediately after the object exits the curve.

FIG. 10 is an illustration for explaining a relationship between the actual center angle $\theta_{cent}r$ and the delay direction $\theta_{cent}FILT$ established immediately after the object 54 exits the curve. After the objects reached the exit of the curve, the actual center angle $\theta_{cent}r$ is decreased, and will be shifted out of the vehicle moving lane area (4). However, the delay direction $\theta_{cent}FILT$ remains in the vehicle moving lane area (4) since the delay direction (4) varies with a delay with respect to the actual center angle $\theta_{cent}r$.

As discussed above, the delay direction $\theta_{cent}FILT$, which is the blunted value of the actual center angle $\theta_{cent}r$, remains in the vehicle moving lane area (4) from the time the object 54 anterior to the radar equipped vehicle 52 enters the curve and until the radar equipped vehicle 52 exits the curve. Accordingly, it is possible to perform an accurate determination for a curve moving condition including immediately before the entrance and immediately after the exit of the curve by determining whether the object 54 and the vehicle 52 are in the same lane based on whether or not the delay direction $\theta_{cent}FILT$ exists in the vehicle moving lane.

Now returning to FIG. 6, after the process of step 103 or steps 104 and 105 is performed for all of the detected objects, and the object center angle $\theta_{cent}$ is obtained for each of the objects, a process of step 106 is performed. It is determined, in step 106, whether or not the condition (vehicle moving lane condition) of the radar equipped vehicle lane area represented by the above-mentioned relationship (4) is satisfied for each of the detected objects. If it is determined that the vehicle moving lane condition is established for none of the objects, the routine is ended without performing any process. On the other hand, if it is determined that there is an object which satisfies the vehicle moving lane condition, the routine proceeds to step 108. In step 108, the object which satisfies the vehicle moving lane condition is determined to be an object existing in the radar equipped vehicle moving lane, and then the routine is ended.

According to the above-mentioned method, it can be determined with an accurate response as to whether or not an object newly entered in the detectable range is in the radar equipped vehicle lane. Additionally, it can be determined with high accuracy as to whether or not an object continuously exists in the radar equipped vehicle lane, including the time when the object and the vehicle enter and exit a curve.

In the above-mentioned embodiment, the digital filter is used for obtaining the blunted value as a method for providing a delay to the actual center angle $\theta_{cent}r$ to calculate the delay direction $\theta_{cent}FILT$. However, the present invention is not limited to the use of a digital filter, and a predetermined delay may be provided to obtain the delay direction $\theta_{cent}FILT$ by applying a known delay process to the actual center angle $\theta_{cent}r$.

A description will now be given of a second embodiment of the present invention. The scan-type radar apparatus for a vehicle according to the second embodiment of the present invention has the same structure as that of the radar apparatus according to the first embodiment shown in FIG. 1. In the radar apparatus according to the second embodiment, the radar ECU 30 performs a routine according to a flowchart shown in FIG. 11 instead of the process according to the flowchart shown in FIG. 6.

In the above-mentioned first embodiment, it is always determined based on the delay direction $\theta_{cent}FILT$, which is a blunted value of the actual center angle $\theta_{cent}r$, as to whether an object continuously existing in the detectable range is in the radar equipped vehicle lane. According to this method, an accurate determination can be performed at an entrance and exit of a curve. However, a determination cannot be performed with a quick response when an object moves from the radar equipped vehicle lane to the other lanes. The second embodiment is characterized in that a lane change of an object in the radar equipped vehicle lane can be detected with a quick response while an accurate determination of the existence of an object in the vehicle moving lane at the entrance and exit of a curve is maintained.

Figure 11:
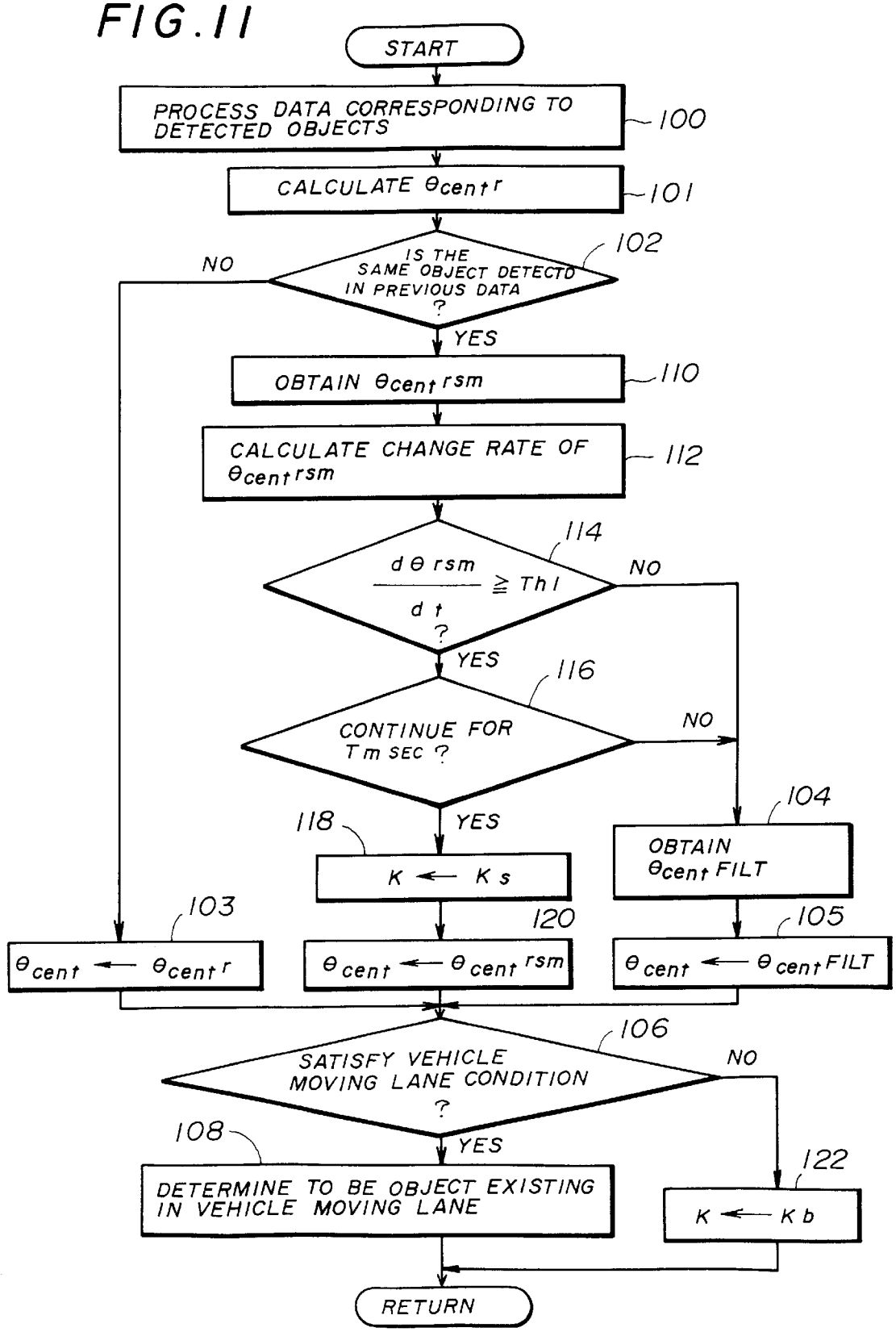
FIG. 11 is a control routine performed by the radar ECU of a radar apparatus according to a second embodiment of the present invention.

FIG. 11 is a control routine performed by the radar ECU 30 in the radar apparatus according to the second embodiment. In FIG. 11, steps that are the same as the steps shown in FIG. 6 are given the same reference numerals, and descriptions thereof will be omitted.

The routine shown in FIG. 11 is started each time the radar antenna 40 scans from -10 degrees to +10 degrees. When it is determined, in step 102, that there is an object existing in the previous data, the routine proceeds to step 110. In step 110, a blunted value $\theta_{cent}rsm$ is calculated. The blunted value $\theta_{cent}rsm$ is obtained by filtering the actual center angle $\theta_{cent}r$ with a low-pass filter having a relatively high cut-off frequency such as 1 Hz.

In step 112, a change rate of the blunted value $\theta_{cent}rsm$ is calculated. The blunted value $\theta_{cent}rsm$ quickly responds to a change in the actual center angle $\theta_{cent}r$ as compared to a response of the delay direction $\theta_{cent}FILT$. Accordingly, the blunted value $\theta_{cent}rsm$ exhibits a relatively quick change when the object performs a lane change.

In step 114, it is determined whether the change rate $d\theta rsm/dt$ of the blunted value $\theta_{cent}rsm$ generated during a period from the last process to the current process is equal to or greater than a predetermined value Th1. The predetermined value Th1 is set to a value so that the condition of step 114 is satisfied when the object performs a lane change. Accordingly, if it is determined that the condition of step 114 is not satisfied, it can be determined that the object does not perform a lane change. In this case, the routine proceeds to step 104 to obtain the delay direction $\theta_{cent}FILT$ based on the above-mentioned expression (5). Then, in step 105, the delay direction $\theta_{cent}FILT$ is stored as an object center angle $\theta_{cent}$, and the routine proceeds to step 106.

On the other hand, if it is determined, in step 114, that the change rate is equal to or greater than the predetermined value Th1, the routine proceeds to step 116. It is determined, in step 116, whether or not the change rate $d\theta rsm/dt$ continuously exceeds for a predetermined period of time Tm sec. If the determination of step 116 is negative, it can be determined that a position of the object was temporarily changed and no lane change was performed. Thus, the routine proceeds to step 104 to obtain the delay direction $\theta_{cent}FILT$ based on the above-mentioned expression (5). Then, in step 105, the delay direction $\theta_{cent}FILT$ is stored as an object center angle $\theta_{cent}$, and the routine proceeds to step 106.

If it is determined that the change rate $d\theta rsm/dt$ continuously exceeds for the predetermined period of time Tm sec, it can be determined that the object if in the process of changing the lane. In this case, the routine proceeds to step 118 to substitute a value Ks, which is less than the standard value Kb used in the first embodiment, for the constant K used in the above-mentioned relationship (4). In the present embodiment, the value Ks is set to 0.7. The vehicle moving lane area recognized by the radar ECU 30 is narrow as the constant K in the relationship (4) is small. Thus, when the process of step 118 is performed, the vehicle moving lane area recognized by the radar ECU 30 is narrower than that obtained when the standard value Kb is set to the constant K.

After the process of step 118 is completed, the routine proceeds to step 120. In step 120, the blunted value $\theta_{cent}$rsm is substituted for the object center angle $\theta_{cent}$, and the routine proceeds to step 116. Then, it is determined, in step 106, whether or not the object center angle $\theta_{cent}$ satisfies the vehicle moving lane condition represented by the above-mentioned relationship (4). If it is determined that the radar equipped vehicle moving lane condition is satisfied by the object center angle $\theta_{cent}$, the routine proceeds to step 108. In step 108, the object which satisfies the radar equipped vehicle moving lane condition is determined to be an object in the radar equipped vehicle moving lane.

On the other hand, if it is determined, in step 106, that the object center angle $\theta_{cent}$ does not satisfy the radar equipped vehicle moving lane condition, the routine proceeds to step 122. In step 122, the standard value Kb is substituted for the constant K used in the above-mentioned relationship (4).

The control routine is ended when step 108 or step 122 is completed.

According to the above-mentioned control process, similar to the first embodiment, the establishment of the radar equipped vehicle moving lane condition is determined based on the delay direction $\theta_{cent}$FILT calculated by the expression (5) and the vehicle moving lane area determined by the standard value Kb when the blunted value $\theta_{cent}$rsm of the object in the detectable range is gently changed such as at the entrance or exit of a curve. Accordingly, an accurate determination is performed when the object and the radar equipped vehicle enter or exit a curve.

Additionally, when the object performs a lane change, the establishment of the vehicle moving lane condition is determined based on the blunted value $\theta_{cent}$rsm which changes quickly as compared to the delay direction $\theta_{cent}$FILT calculated by the expression (5) and the vehicle moving lane area determined by the standard value Ks which is less than the standard value Kb. In this process, the object changing the lane can be eliminated quickly from the objects already existing in the radar equipped vehicle moving lane when the object moves from the radar equipped vehicle moving lane to another lane. Thus, in the present embodiment, an accurate determination at an entrance or exit of a curve and a quick response for a determination of a lane change are compatible with each other at a high level.

A description will now be given, with reference to FIGS. 12 to 15, of a third embodiment of the present invention. A scan-type radar apparatus according the third embodiment of the present invention has the same structure as that of the radar apparatus according to the first embodiment shown in FIG. 1. In the radar apparatus according to the third embodiment, the radar ECU 30 performs a routine according to a flowchart shown in FIG. 14 instead of the control process according to the flowchart shown in FIG. 6 or FIG. 11.

Figure 12:
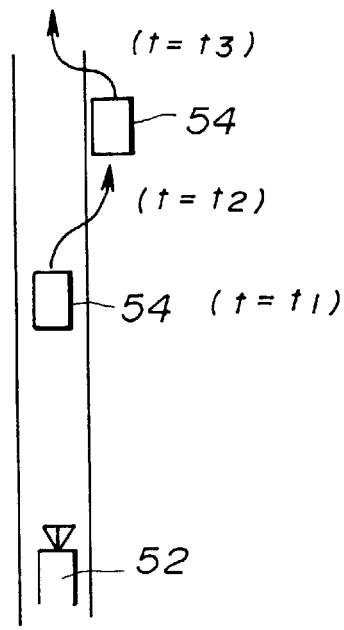
FIG. 12 is an illustration of a radar equipped vehicle and an object which moves to another lane at a time t1 and returns to the radar equipped vehicle lane at a time t2.
Figure 13A:
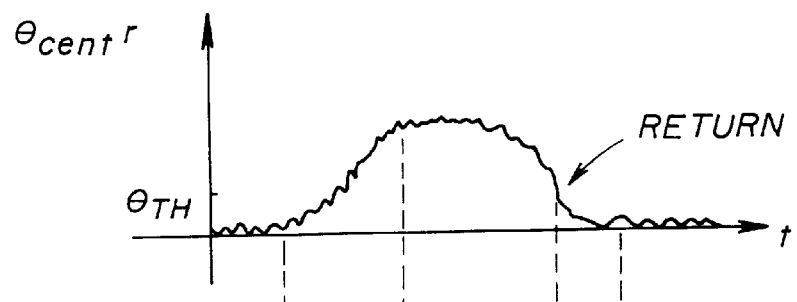
FIG. 13A is a graph showing a variation of the actual center angle $\theta_{cent}r$.
Figure 13B:
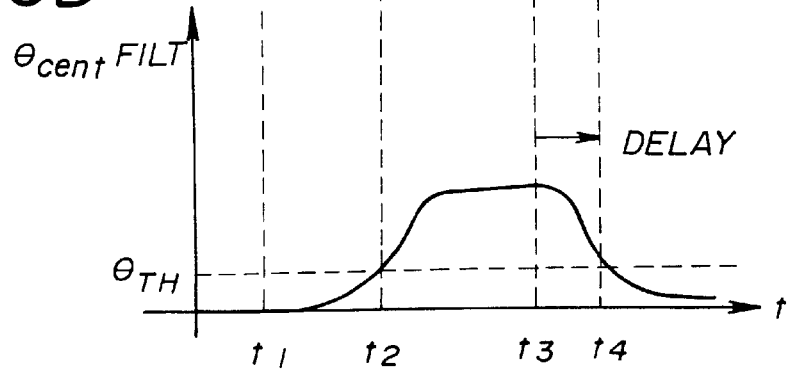
FIG. 13B is a graph showing a variation of the delay direction $\theta_{cent}FILT$ corresponding to the variation of the actual center angle $\theta_{cent}r$ shown in FIG. 13A.

FIG. 12 is an illustration of the radar equipped vehicle 52 and the object 54 which moves to another lane during a period from a time t1 to a time t2 and returns to the radar equipped vehicle lane at a time t3. FIG. 13A is a graph showing a variation of the actual center angle $\theta_{cent}$r when the object moves as mentioned above. FIG. 13B is a graph showing a variation of the delay direction $\theta_{cent}$FILT calculated based on the expression (5) and corresponding to the variation of the actual center angle $\theta_{cent}$r shown in FIG. 13A. IT should be noted that, $\theta_{Th}$ is a limit value of the vehicle moving lane area calculated based on the relationship (4).

In the above-mentioned first embodiment, all of the objects continuously detected in the detectable range are the objects of which lane is determined based on the object center angle $\theta_{cent}$ calculated based on the expression (5). This method is effective to obtain an accurate determination performed at an entrance and exit of a curve. However, it is not possible to quickly detect an object entering from another lane to the radar equipped vehicle moving lane.

That is, as shown in FIG. 13A, the actual center angle $\theta_{cent}$r decreases to a value less than the limit value $\theta_{TH}$ immediately after the time t3 when the object 54 starts to return to the radar equipped vehicle moving lane. On the other hand, as shown in FIG. 13B, the object center angle $\theta_{cent}$r which is calculated based on the expression (5), reaches the limit value $\theta_{TH}$ at a time t4 which is a predetermined period delayed from the time t3. Accordingly, if the moving lane is determined based on the object center angle $\theta_{cent}$, the detection of the object 54 is delayed a period t4–t3 from the detection based on the actual center angle $\theta_{cent}$r.

The third embodiment is characterized in that an object entering from another lane can be can be detected with a quick response while an accurate determination of the existence of an object in the vehicle moving lane at the entrance and exit of a curve is maintained.

Figure 14:
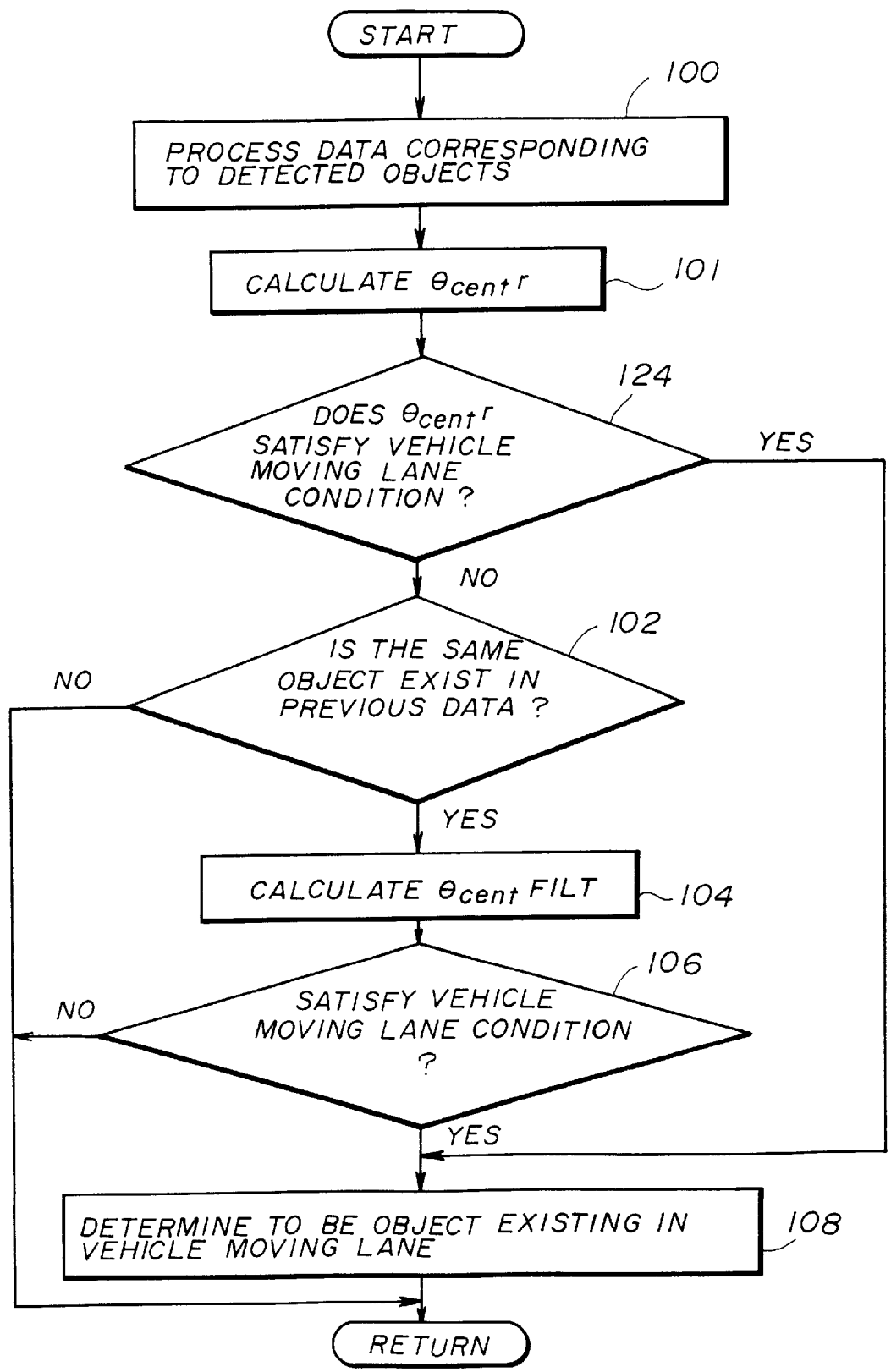
FIG. 14 is a control routine performed by the radar ECU of a radar apparatus according to a third embodiment of the present invention.

The routine shown in FIG. 14 is started at every time the scanning operation is performed by the radar antenna 40 from −10 degrees to +10 degrees of the scan angle $\theta_S$. In the routine shown in FIG. 14, after the actual center angle $\theta_{cent}$r of each of the recognized objects is calculated, in step 101, based on the grouped sets of data, the routine proceeds to step 124.

In step 124, it is determined whether or not the actual center angle $\theta_{cent}$r satisfies the vehicle moving lane condition. If it is determined that the actual center angle $\theta_{cent}$r satisfies the vehicle moving lane condition, the routine proceeds to step 108 so that the object corresponding to the actual center angle $\theta_{cent}$ stored as an object existing in the radar equipped vehicle moving lane. On the other hand, if it is determined, in step 124, that the actual center angle $\theta_{cent}$r is out of the radar equipped vehicle moving lane area, the routine proceeds to step 102.

In step 102, it is determined whether or not the current object detected at this time exists in the sets of previous data. As a result, it can be determined that the current object is an object newly entered in the detectable range but not existing in the radar equipped vehicle moving lane. Such an object is eliminated from the object to be processed without being applied with the process of step 108.

On the other hand, if it is determined, in step 102, that the object exists in the sets of previous data, such an object can be determined to be the object which was eliminated from objects existing in the radar equipped vehicle moving lane due to entry into a curve. Such an object is subjected to the process for determining whether or not the delay direction $\theta_{cent}$FILT thereof satisfies the vehicle moving lane condition. in steps 104 and 106.

If it is determined that the vehicle moving lane condition is satisfied, the routine proceeds to step 108 so that the object is recognized as an object existing in the radar equipped vehicle moving lane. On the other hand, if it is determined, in step 106, that the vehicle moving lane condition is not satisfied, the object is eliminated from objects to be processed without being subjected to the process of step 108. The control routine is ended after each of the above-mentioned processes is performed for each of the detected objects.

Figure 15A:
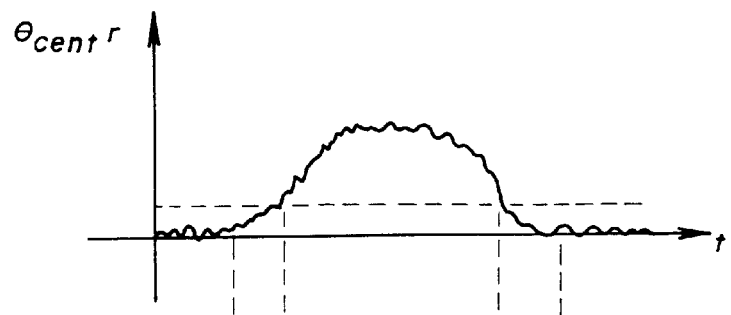
FIG. 15A is a graph, similar to FIG. 13A, a variation of the actual center angle $\theta_{cent}r$.
Figure 15B:
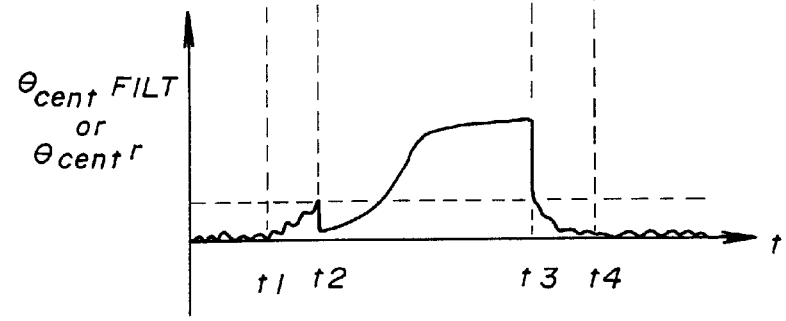
FIG. 15B is a graph showing a variation of a determination value used for determining an establishment of a vehicle moving lane condition.

FIG. 15A illustrates, similar to FIG. 13A, a variation of the actual center angle $\theta_{cent}r$ of the object 54. FIG. 15B illustrates a variation of a determination value used for determining an establishment of the vehicle moving lane condition in the present embodiment. The determination value is a combination of the actual center angle $\theta_{cent}r$ and the delay direction $\theta_{cent}$FILT.

As shown in FIG. 15B, according to the above-mentioned process, when the object 54 is continuously detected in the vehicle moving lane area, it is determined whether the object 54 satisfies the vehicle moving lane condition based on the delay direction $\theta_{cent}$FILT. Accordingly, an accurate determination can be made, similar to the first embodiment, when the object 54 enters and exits a curve. Additionally, when the object 54 is entering from another lane, it is determined whether or not the object 54 satisfies the vehicle moving lane condition based on the actual center angle $\theta_{cent}r$. Thus, according to the present embodiment, an object entering the radar equipped vehicle lane from another lane can be detected with a quick response.

A description will now be given, with reference to FIGS. 16 to 20, of a fourth embodiment of the present invention. A scan-type radar apparatus according to the fourth embodiment of the present invention has the same structure as that of the radar apparatus according to the first embodiment shown in FIG. 1. In the radar apparatus according to the fourth embodiment, the radar ECU 30 performs a routine according to a flowchart shown in FIGS. 18 to 20 instead of the control process according to the flowchart shown in FIG. 6, FIG. 11 or FIG. 14.

The radar apparatus according to the fourth embodiment of the present invention is characterized in that a determination of an object entering a curve is made based on a detection as to whether a plurality of objects existing anterior of the radar equipped vehicle show the same movement.

Figure 16:
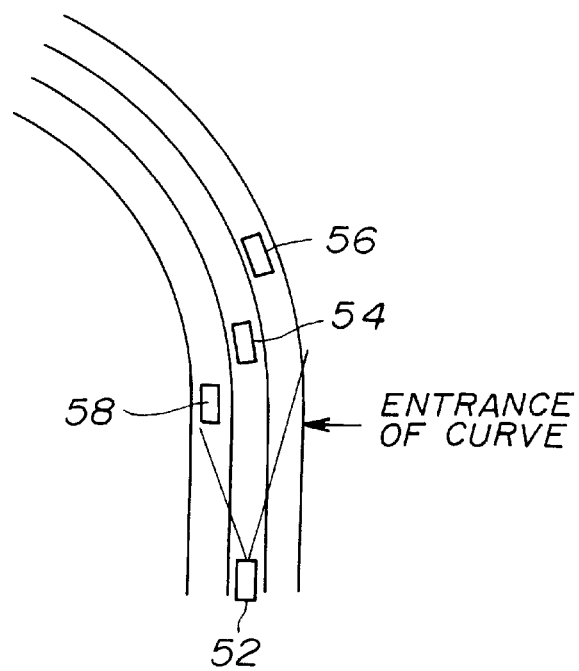
FIG. 16 is an illustration of a radar equipped vehicle and a plurality of objects including an object existing in the radar equipped vehicle lane and objects moving in other lanes.

FIG. 16 is an illustration of the radar equipped vehicle and a plurality of objects including the object 54 existing in the radar equipped vehicle lane and objects 56 and 58 moving in other lanes. The objects 56 and 58 may be hereinafter referred to as other lane objects. In FIG. 16, the radar equipped vehicle 52 is just entering a curve. The other lane object 58 is moving between the object 54 and the radar equipped vehicle 52. The other lane object 56 is moving ahead of the object 54.

Figure 17:
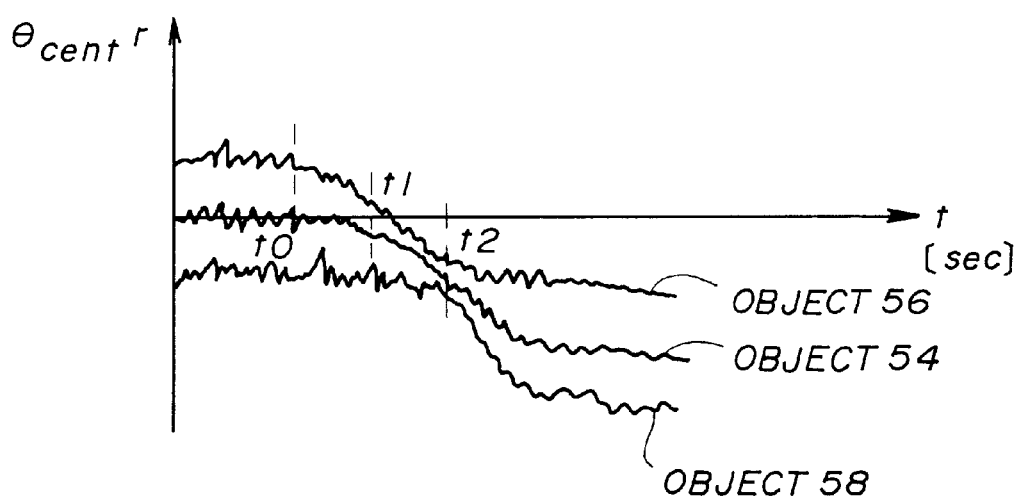
FIG. 17 is a graph showing a variation of the actual center angle $\theta_{cent}r$ detected by the radar equipped vehicle.

FIG. 17 is a graph showing a variation of the actual center angle $\theta_{cent}r$ detected by the radar equipped vehicle 52 with respect to each of the objects 54, 56 and 58. As shown in FIG. 16, when the objects 56, 54 and 58 enter the curve in that order, the actual center angle $\theta_{cent}r$ of each of the objects changes with a time delay in the same direction. Accordingly, when such variation of the actual center angle $\theta_{cent}r$ is detective in a plurality of objects, it is determined that the objects 54, 56 and 58 entered or exited a curve.

In the present embodiment, when it is determined that the a plurality of objects anterior to the radar equipped vehicle 52 enter or exit the curve based on the movement of the objects, the object 54 is determined to exist in the radar equipped vehicle lane for a predetermined period irrespective of whether the actual center angle $\theta_{cent}r$ or the delay direction $\theta_{cent}$FILT of the object 54 is in the radar equipped vehicle moving lane. Accordingly, an erroneous determination that the object 54 moved to another lane can be prevented when the object 54 entered into the curve.

Figure 18:
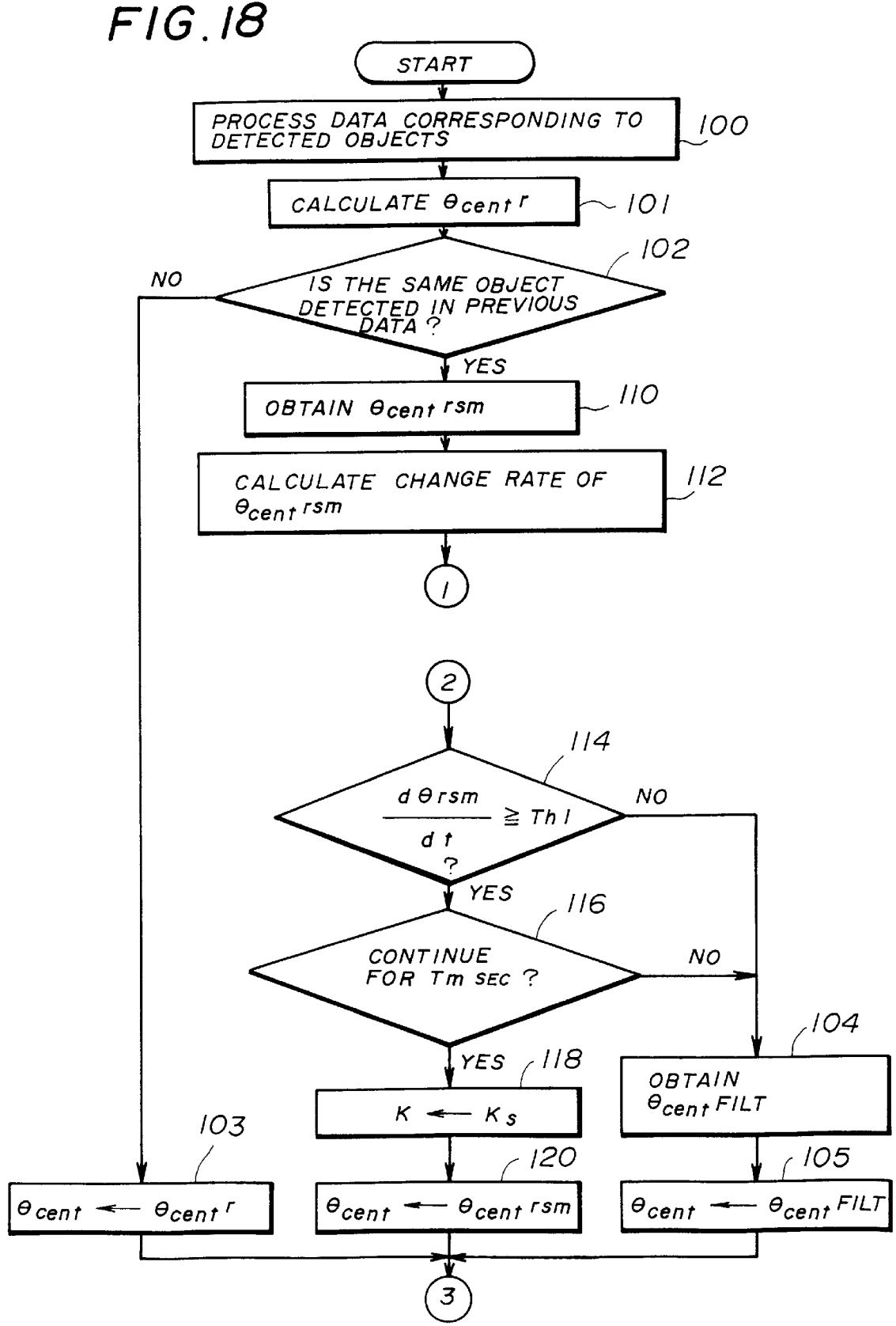
FIGS. 18, 19 and 20 are parts of a control routine performed by the radar ECU of a radar apparatus according to a fourth embodiment of the present invention.
Figure 19:
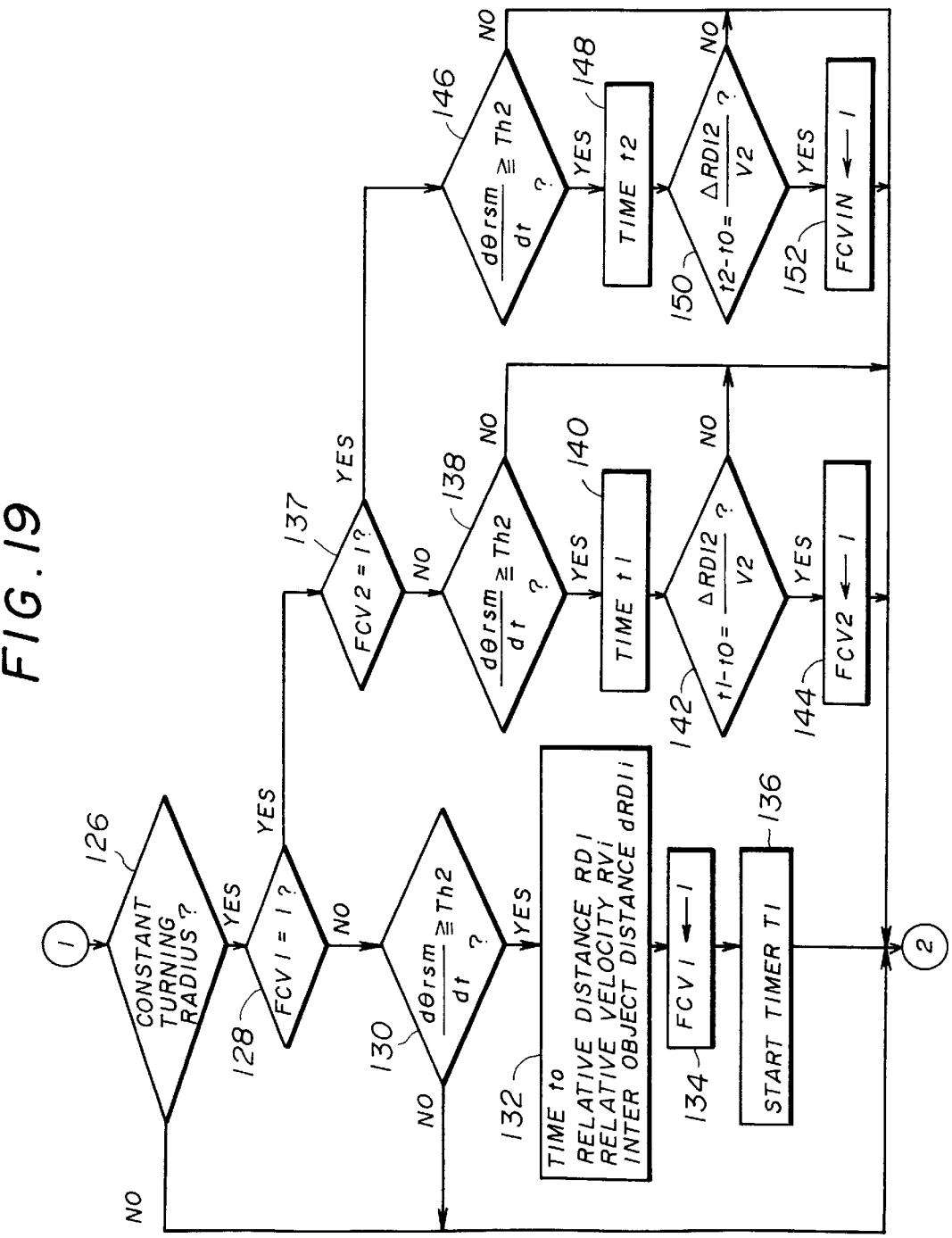
Figure 20:
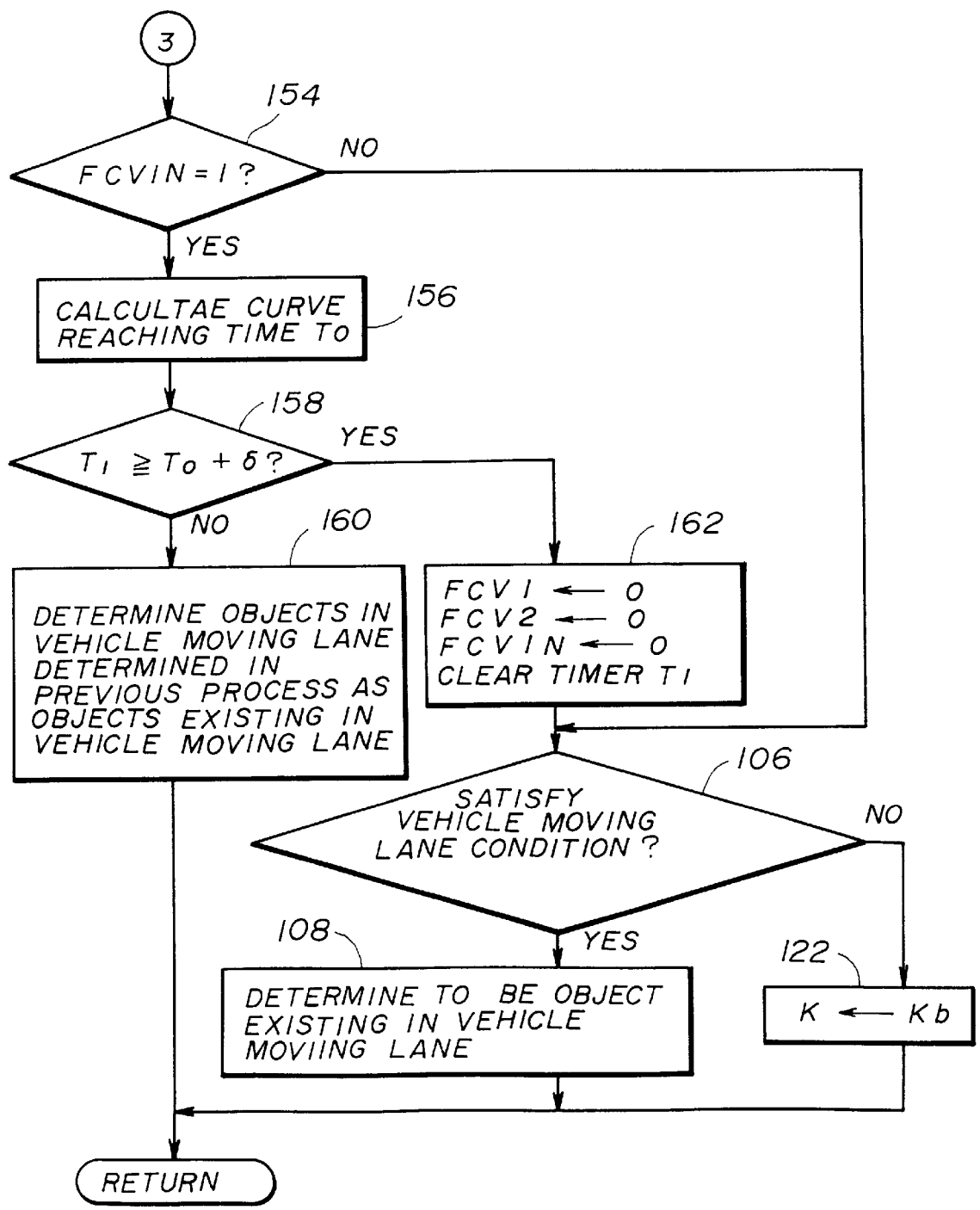

FIGS. 18 to 20 are parts of a flowchart of a control routine performed by the radar ECU 30. In FIGS. 18 to 20, steps that are the same as the steps shown in FIG. 11 are given the same reference numerals, and descriptions thereof will be omitted. The control routine shown in FIGS. 18 to 20 is started each time the radar antenna scans −10 degrees to +10 degrees.

When the control routine is started, the actual center angle $\theta_{cent}r$ is calculated, in steps 100 and 101, for each of the detected objects anterior to the radar equipped vehicle 52. The blunted value $\theta_{cent}rsm$ and the change rate $d\theta rsm/dt$ is calculated in steps 102, 110 and 112 with respect to the objects continuously detected from the previous process. After the above process is completed, the routine proceeds to step 126.

In step 126, it is determined whether or not the turning radius of the vehicle 52 is maintained to be a constant value. If the turning radius fluctuates and is not maintained to be a constant value, it is determined that the vehicle 52 is moving at the entrance or the exit of the curve. In the routine, the process of the steps 128 to 152 is provided for determining movement of the object 54 when the radar equipped vehicle 52 is moving straight or turning in the middle of a curve. Accordingly, when the vehicle 52 is moving at the entrance or the exit of the curve, the process of steps 128 to 125 should not be performed. Thus, when it is determined that the turning radius of the vehicle 52 is not constant, the process of steps 128 to 152 is skipped, and the process of step 114 shown in FIG. 18 is performed. On the other hand, if it is determined, in step 126, that the turning radius of the vehicle 52 is maintained to be constant, the routine proceeds to step 128.

In step 128, it is determined whether or not a flag FCV1 is set to "1". The flag FCV1 represents a relatively large change rate $d\theta rsm/dt$ being detected in one of the objects anterior to the vehicle 52. Thus, when the large change rate $d\theta rsm/dt$ has not been detected in the previous process, the flag FCV1 is not set to "1". In this case, the routine proceeds to step 130.

In step 130, it is determined whether or not there is an object having the blunted value $\theta_{cent}rsm$ is varied at a change rate greater than a predetermined value Th2. The predetermined value Th2 is set to a value so that a relationship $d\theta rsm/dt \geq Th2$ is satisfied when a remote object moving in a position away from the vehicle 52 enters the curve. The distance between the remote object and the vehicle 52 is, for example, about 70 m.

If it is determined, in step 130, that there is no object satisfying the relationship $d\theta rsm/dt \geq Th2$, it is determined that there is no object which entered a curve or changed a lane. In this case, the process of steps 132 to 152 is skipped, and the routine proceeds to step 114. On the other hand, if it is determined, in step 132, that there is an object which satisfies the relationship $d\theta rsm/dt \geq Th2$the, it is determined that there is an object which entered a curve or changed a lane. In this case, the routine proceeds to step 132. In FIG. 16, the object 56 corresponds to the object which satisfies the relationship $d\theta rsm/dt \geq Th2$.

In step 132, a time t0 when the process of step 132 is started is stored. Additionally, a relative distance RD1 between the vehicle 52 and the object 56, a relative velocity RVi of the object 56 with respect to the vehicle 52 and an inter-object distance dRD1i between the object 56 and one of other objects are stored at the tine t0. It should be noted that "i" of RVi and dRD1i indicates a number provided to each of a plurality of objects. After the above-mentioned process is completed, the routine proceeds to step 134.

In step 134, the flag FCV is set to "1". Then, in step 136, a timer T1 is started. The timer T1 is provided for timing a period starting at a time when a change which satisfies the relationship $d\theta rsm/dt \geq Th2$ is recognized in one of the objects. After the process of step 136 is completed, the routine proceeds to step 114 shown in FIG. 18.

If the present routine is started after the flag FCV is set to "1", it is determined, in step 128, that the flag FCV1 is set to "1". Thus, in this case, the routine proceeds to step 137. In step 137, it is determined whether or not a flag FCV2 is set to "1". The flag FCV2 is set to "1" when the relationship $d\theta rsm/dt \geq Th2$ is satisfied with respect to one of the object excluding the object 56. If it is determined that the flag FCV2 is not set to "1", the routine proceeds to step 138.

In step 138, it is determined whether or not there is an object, which has a change rate greater than the predetermined value Th2 and the blunted value being varied, among the objects excluding the object 56. If it is determined that there is no object which satisfies the above condition, it is determined that there is no object whose movement is similar to the movement of the object 56. In this case, the routine proceeds to step 114. On the other hand, if it is determined that there is such an object which satisfies the above condition, it is determined that there is an object whose movement is similar to the movement of the object 56. In this case, the routine proceeds to step 140. In FIG. 16, the object 54 corresponds to the object whose movement is similar to the movement of the object 56.

In step 140, the time t1 when the process of step 140 is started, that is, the time when the condition of step 138 is established, is stored. After the process of step 138 is completed, the routine proceeds to step 142.

In step 142, it is determined whether or not the time difference "t1–t0" between the time t1 and the time t0 is approximately equal to an assumed time difference dRD12/V2. The assumed time difference dRD12/V2 is a period of time obtained by dividing the inter-object distance dRD12, which was formed between the objects 56 and 54 at the time t0, by an absolute velocity V of the object 54. The absolute velocity V2 of the object 54 is calculated by adding the relative velocity RV2 of the object 54 at the time t0 to the velocity V of the vehicle 52. Accordingly, the assumed time difference dRD12/V2 corresponds to the period from the time t0 to the time when the object 54 reaches the entrance or the exit of the curve.

If it is determined that the time difference "t1–t0" is approximately equal to the assumed time difference "dRD12/V2", it can be determined that the movement of the object 54 and the movement of the object 56 are similar to each other. In this case, the routine proceeds to step 144. On the other hand, if it is determined, in step 142, that the time difference "t1–t0" is different from the assumed time difference "dRD12/V2", it is determined that the movement of the object 54 and the movement of the object 56 are not similar to each other. In this case, the process of step 144 is skipped and the routine proceeds to step 114 shown in FIG. 18.

In step 144, the flag FCV2 is set to "1". Then, the routine proceeds to step 114.

If the present routine is started after the flag FCV2 is set to "1", it is determined, in step 136, that the flag FCV2 is set to "1". In this case, the routine proceeds to step 146.

In step 146, it is determined whether or not there is an object whose blunted value $\theta_{cent}$rsm is changed at a change rate $d\theta rsm/dt$ greater than the predetermined value Th2 among objects excluding the objects 54 and 56. If it is determined that there is no object which satisfies the above condition, it is determined that there is no object which shows a movement similar to the movement of the objects 54 and 56. In this case, the routine proceeds to step 114 shown in FIG. 18. On the other hand, if it is determined that there is an object which satisfies the condition $d\theta rsm/dt \geq Th2$, it is determined that there are three objects anterior to the vehicle 52 which objects show a movement to each other. In this case, the routine proceeds to step 148. In FIG. 16, the object 58 corresponds to the object which satisfies the above condition.

In step 148, the time t1 when the process of step 148 is started, that is, when the condition of step 146 is established, is stored. After this process is completed, the routine proceeds to step 150.

In step 150, it is determined whether or not the time difference "t2–t0" between the time t2 and the time t0 is approximately equal to an assumed time difference dRD13/V3. The assumed time difference dRD13/V3 is a period of time obtained by dividing the inter-object distance dRD13, which was formed between the objects 56 and 58 at the time t0, by an absolute velocity V3 of the object 58. The absolute velocity V3 of the object 58 is calculated by adding the relative velocity RV3 of the object 58 at the time t0 to the velocity V of the vehicle 52. Accordingly, the assumed time difference dRD13/V3 corresponds to the period from the time t0 to the time when the object 58 reaches the entrance or the exit of the curve.

If it is determined that the time difference "t2–t0" is approximately equal to the assumed time difference "dRD13/V3", it can be determined that the movement of the object 58 and the movement of the object 56 are similar to each other. In this case, the routine proceeds to step 152. On the other hand, if it is determined, in step 150, that the time difference "t2–t0" is different from the assumed time difference "dRD13/V3", it is determined that the movement of the object 58 and the movement of the object 56 are not similar to each other. In this case, the process of step 152 is skipped and the routine proceeds to step 114 shown in FIG. 18.

In step 152, a flag FCVIN is set to "1". Then, the routine proceeds to step 114. As mentioned above, in this routine, the flag FCVIN is set to "1" when there is at least three objects showing a similar movement in the area anterior to the radar equipped vehicle 52.

When the three objects existing in the anterior area of the vehicle 52 show a similar movement with a time difference corresponding to the inter-object distance RD1i, it is determined with a high probability that the three objects sequentially entered or exited the curve. Accordingly, in this routine, when the flag FCVIN is equal to 1, it is determined with a high probability that the object 54 entered or exited the curve.

In steps 114 to 120, 104 and 105, similar to the second embodiment, the standard value Ks which is smaller than the standard value Kb is substituted for the constant K. additionally, the object center angle $\theta_{cent}$ is substituted for the actual center angle $\theta_{cent}$r, or the object center angle $\theta_{cent}$ is substituted for the delay direction $\theta_{cent}$FILT. After these processes are completed, the routine proceeds to step 154.

In step 154, it is determined whether or not the flag FCVIN is set to "1". The condition of step 154 is not established when it is not assumed that the object 54 entered or exited the curve based on the movement of a plurality of objects. In this case, the routine proceeds to step 106 so as to determine whether the vehicle moving lane condition is established, similar to the second embodiment.

After the process of step 106 is completed, the routine proceeds to step 108 or step 122 depending on the result of determination of step 106, and the routine is ended. In this process, it is determined whether or not the object 54 exists in the radar equipped vehicle moving area similar to the second embodiment.

If it is determined, in step 154, that the flag FCVIN is set to "1", the routine proceeds to step 156. In step 156, a curve reaching time T0 is calculated. The curve reaching time T0 is a period of time which will be spent by the vehicle 52 to reach at the position of the object 56 at which position the movement satisfying the relationship $d\theta rsm/dt \geq Th2$ is recognized in the object 56. In this routine, the curve reaching time T0 is calculated by dividing the relative distance RD1 by the velocity V of the vehicle 52, the relative distance RD1 being a distance between the object 56 and the vehicle 52 at the time t0. After T0=RD1/V is calculated, the routine proceeds to step 158.

In step 158, it is determined whether or not the time indicated by the timer T1, which is started at the time t0, has reached a sum of the curve reaching time T0 and a predetermined time value $\delta$. If the change in the movement of the object 56 at the time t0 is caused by the object 56 entering or exiting the curve, it is determined that the object 56 is at the entrance or exit of the curve at the time t0. In this case, the time t0+T0 corresponds to the time when the vehicle 52 reaches the entrance or exit of the curve.

When the object 54, which was determined to exist in the radar equipped vehicle moving lane, is moving behind the object 54, the object 54 reaches the entrance or exit of the curve at the time t2 which is between the time t0 and the time t0+T0. If the object 54 is the remote object which is moving a relatively long distance away from the vehicle 52, there is a large time difference between the time t2 and the time t0+T0.

The delay direction $\theta_{cent}$FILT calculated for the object 54 begins to vary gently while following the variation of the actual center angle $\theta_{cent}$r after the actual center angle $\theta_{cent}$r begins to vary. On the other hand, the vehicle moving lane area obtained in accordance with the above-mentioned relationship (4) is maintained to be an area corresponding to the straight lane until the time t0+T0 is reached. After the time t0+T0 is reached, the vehicle moving lane area is corrected to an area in accordance with the turning radius of the vehicle 52.

When the time difference between the time t2 when the actual center angle $\theta_{cent}$r begins to vary and the time t0+T0 when the vehicle moving lane area begins to be corrected is not sufficiently large, the correction of the vehicle moving lane area is started prior to the delay direction $\theta_{cent}$FILT shifting out of the vehicle moving lane area. In this case, the result of determination as to whether the delay direction $\theta_{cent}$FILT exists in the vehicle moving lane area accurately matches the fact as to whether the object 54 is existent in the vehicle moving lane.

However, if the object 54 is the remote object and the time difference between the time t1 and the time t0+T0 is large, The delay direction $\theta_{cent}$FILT may be shifted out of the vehicle moving lane area before the correction to the vehicle moving lane area is started. In this case, depending on a determination logic for determining the vehicle moving lane, there is a possibility of an erroneous determination that the object 54 does not exist in the vehicle moving lane despite that the object 54 is actually moving in the vehicle moving lane.

The predetermined time value $\delta$ used in step 158 is set to a time period necessary for correcting the vehicle moving lane area after the vehicle 52 reached the entrance or exit of the curve. Accordingly, if it is determined, in step 158, that the relationship T1 $\geq$ T0+$\delta$ is not satisfied, it is recognized that the correction to the vehicle moving lane area has not been performed yet despite the fact that the object 54 has already reached the entrance or exit of the curve. In this case, if the delay direction $\theta_{cent}$FILT should be shifted out of the vehicle moving lane area, it is appropriate to determine that the object 54 exists in the vehicle moving lane. In this routine, when such a determination is made in step 158, the routine proceeds to step 160.

In step 160, the objects which were determined to exist in the vehicle moving lane are determined to continuously exist in the vehicle moving lane, and the routine is ended. According to the above-mentioned process, exclusion of the object is prevented from the objects existing in the vehicle moving lane due to the determination that the correction to the vehicle moving lane has not been started after the object, which was determined to exist in the vehicle moving lane in the previous process, entered in the curve.

If it is determined, in step 158, that the relationship T1 $\geq$ T0+$\delta$ is satisfied, it is recognized that the correction to the vehicle moving lane area has been performed so that the vehicle moving lane area is corrected to an area corresponding to the radius of curvature of the area between the vehicle and the object 54 after the object 54 passes the entrance or exit of the curve. When the vehicle moving lane is properly corrected, it is appropriate to determine whether or not the object exists in the vehicle moving lane based on the determination as to whether the object center angle $\theta_{cent}$ satisfies the vehicle moving lane condition. If the above determination is made in step 158, the routine proceeds to step 162.

In step 162, the flags FCV1, FCV2 and FCVIN are reset to "0", and the timer T1 is cleared. Then, the routine proceeds to step 106 so that the determination is performed as to the condition of the vehicle moving lane condition based on the object center angle $\theta_{cent}$. According to the above-mentioned process, is can be determined whether or not an object exists in the radar equipped vehicle moving lane in the same manner as the second embodiment when the correction is made to the vehicle moving lane area.

In the present embodiment, the determination of the object 54 entering a curve is made by referring to the similarity of movement of the three objects 54, 56 and 58. However, the determination may be made by referring to the similarity of movement of two objects or more than three objects.

A description will now be given, with reference to FIGS. 21 to 23, of a fifth embodiment of the present invention. A scan-type radar apparatus according to the fifth embodiment of the present invention has the same structure as that of the radar apparatus according to the first embodiment shown in FIG. 1. In the radar apparatus according to the fifth embodiment, the radar ECU 30 performs a routine according to a flowchart shown in FIGS. 22 and 23 instead of the control process according to the flowchart shown in FIG. 6, FIG. 11, FIG. 14 or FIGS. 18 to 20.

The radar apparatus according to the fifth embodiment of the present invention is characterized in that the objects anterior to the vehicle 52 are classified into a short distance object group, a middle distance object group and a long distance object group so that a determination of an establishment of the vehicle moving lane condition is performed based on the classification.

Figure 21:
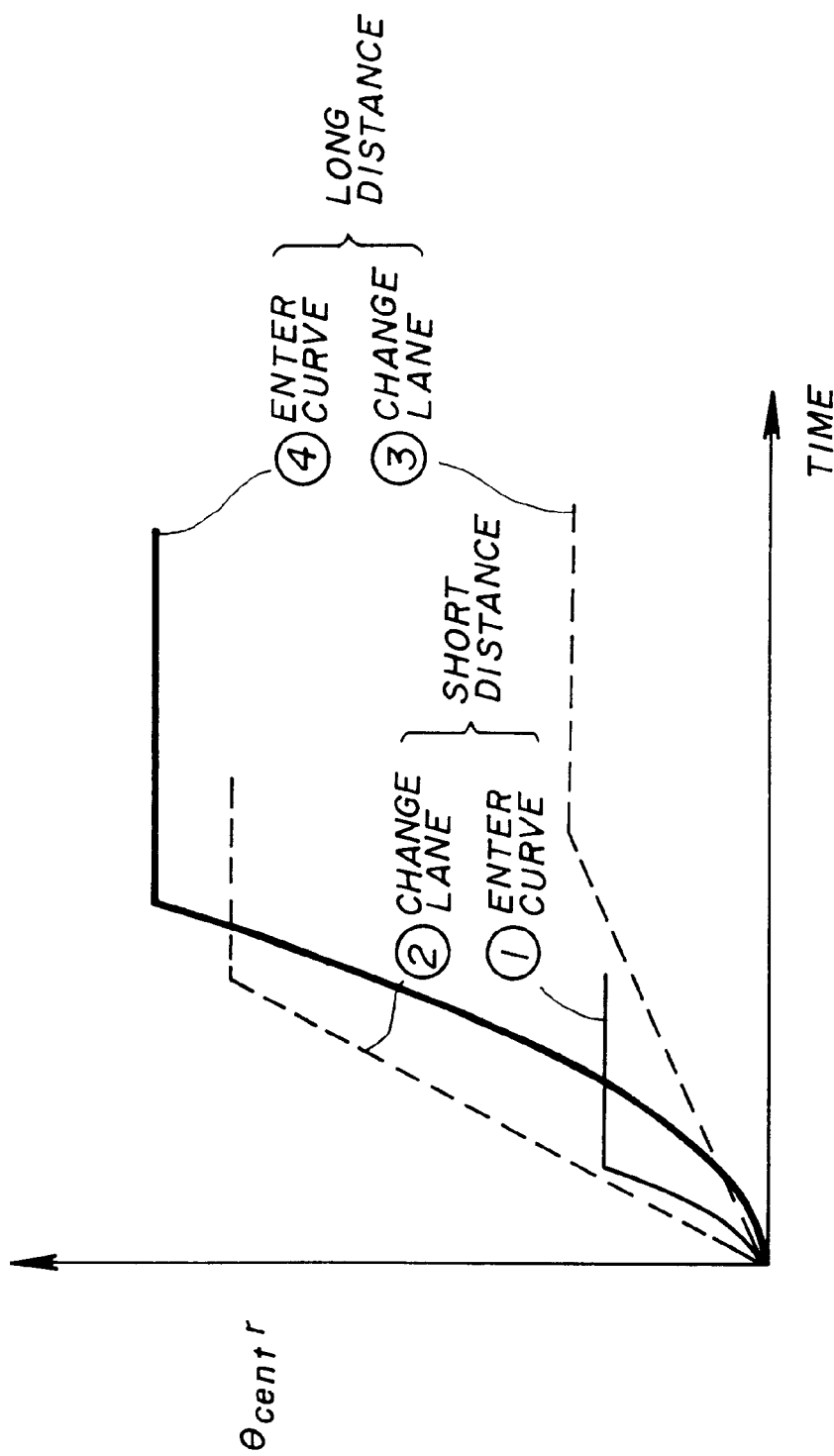
FIG. 21 is a graph showing variations of the actual center angles $\theta_{cent}r$ of a short distance object and a long distance object.

FIG. 21 is a graph showing variation of the actual center angle $\theta_{cent}$r of an object when the object enters a curve or changes a lane. In FIG. 21, a solid line (1) indicates a variation with respect to a short distance object entering a curve, the short distance object being about 20 m apart from the vehicle 52. A dashed line (2) indicates a variation with respect to the short distance object changing a lane. A solid line (4) indicates a variation with respect to a long distance object entering a curve, the long distance object being about 80 m apart from the vehicle 52. A dashed line (3) indicates a variation with respect to the short distance object changing a lane.

When the short distance object and the long distance object move in a direction perpendicular to a side-to-side direction of the object, the variation in the actual center angle $\theta_{cent}r$ of the short distance object is greater than that of the long distance object. Accordingly, when the short distance object enters a curve or changes a lane, the actual center angle $\theta_{cent}r$ of the short distance object is varied faster than the actual center angle $\theta_{cent}r$ of the long distance object.

The relative distance between the object and the vehicle 52 varies by a width of a lane during a lane change of the object. The upper limit (a flat portion) of the dashed line (2) of the actual center angle $\theta_{cent}r$ of the short distance object corresponds to a variation caused by the short distance object being moved by the width of the lane. The upper limit (a flat portion) of the dashed line (3) of the actual center angle $\theta_{cent}r$ of the long distance object corresponds to a variation caused by the long distance object being moved by the width of the lane.

After the object enters the curve, the actual center angle $\theta_{cent}r$ of the object continues to vary until the vehicle 52 enters into the curve. If the object is the short distance object, the vehicle 52 enters the curve in a short time after the object enters the curve. Accordingly, as shown in the solid line (1), the actual center angle $\theta_{cent}r$ of the short distance object reaches a relatively small value. On the other hand, if the object is the long distance object, the vehicle 52 enters the curve after a relatively long period of time has passed since the object entered the curve. Accordingly, as shown in the solid line (4), the actual center angle $\theta_{cent}r$ of the long distance object reaches a relatively large value.

As mentioned above, according to the present embodiment, the object in the vehicle moving lane can be discriminated from among a plurality of objects existing ahead of the vehicle 52. If the objects in the vehicle moving lane can be distinguished, it is easy to extract the object which is closest to the vehicle 52 from among the distinguished objects. Hereinafter, the object closest to the vehicle 52 may be referred to as a first object. For example, if an operation of the vehicle is controlled so that a distance between the vehicle 52 and the first object is a predetermined distance, a safe operation of the vehicle 52 can be achieved when the vehicle 52 is automatically operated. Thus, the radar apparatus according to the present embodiment can be applied to an automatic vehicle guidance control system.

When the operation of the vehicle 52 is automatically guided, in order to achieve a quick response, it is preferable to have a capability of performing an acceleration immediately after the short distance object in the vehicle moving lane has moved to another lane. In this respect, the radar apparatus is required a function to detect a lane change of the short distance object.

As shown in FIG. 21, when the short distance object changes a lane, the actual center angle $\theta_{cent}r$ changes for a relatively long period of time as compared to the actual center angle $\theta_{cent}r$ obtained when the short distance object enters into a curve. Accordingly, it is determined that the short distance object changed a lane when the actual center angle $\theta_{cent}r$ changes for a sufficiently long period of time with a relatively large change rate such as obtained when entering a curve or changing a lane. The radar apparatus according to the present embodiment has a function to perform a quick detection of the lane change of the short distance object according to the above-mentioned method.

As discussed previously, when the long distance object enters a curve, the delay direction $\theta_{cent}FILT$ is shifted out of the vehicle moving lane area irrespective of the object existing in the vehicle moving lane. Accordingly, if a determination based on the delay direction $\theta_{cent}FILT$ is performed for the long distance object as well as the middle distance object, a sufficient accuracy of the determination cannot be obtained.

As shown in FIG. 21, when the long distance object enters a curve, the actual center angle $\theta_{cent}r$ of the long distance object shows a sharp variation as compared to the actual center angle $\theta_{cent}r$ obtained when the long distance object changes a lane. Accordingly, it is determined that the long distance object entered a curve when the actual center angle $\theta_{cent}r$ changes continuously for a sufficiently long period of time sufficient for determining that the object enters a curve or changes a lane with a relatively large change rate. The radar apparatus according to the present embodiment has a function to maintain the long distance object as an object existing in the vehicle moving lane when the long distance object is assumed to enter a curve by the above-mentioned method.

Figure 22:
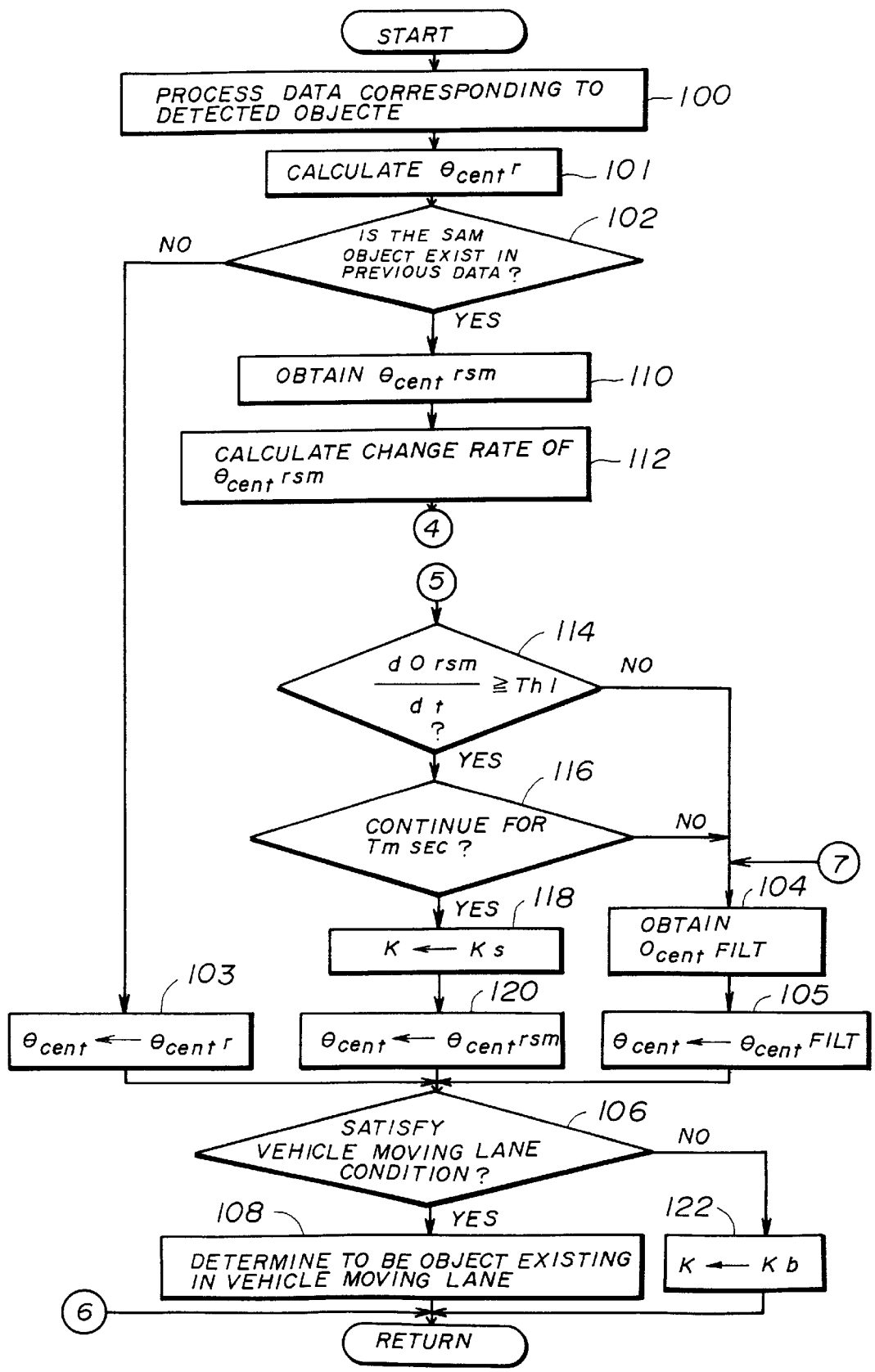
FIGS. 22 and 23 are parts of a control routine performed by the radar ECU of a radar apparatus according to a fifth embodiment of the present invention.
Figure 23:
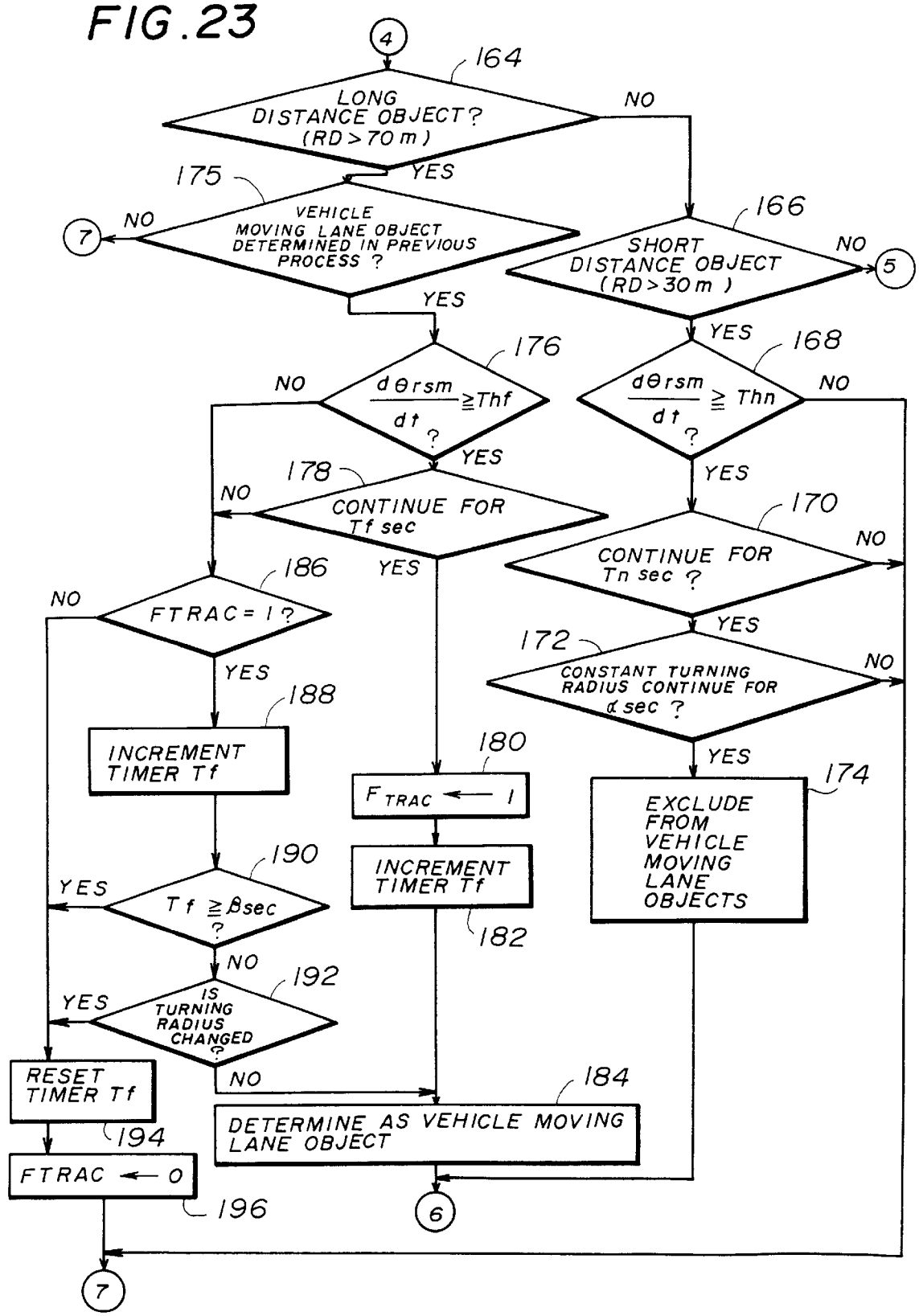

FIGS. 22 and 23 are parts of a flowchart of a control routine performed by the radar ECU 30. In FIGS. 22 and 23, steps that are the same as the steps shown in FIG. 11 are given the same reference numerals, and descriptions thereof will be omitted. The control routine shown in FIGS. 22 and 23 is started each time the radar antenna scans −10 degrees to +10 degrees.

When the control routine is started, the actual center angle $\theta_{cent}r$ is calculated, in steps 100 and 101, for each of the detected objects anterior to the radar equipped vehicle 52. The blunted value $\theta_{cent}rsm$ and the change rate $d\theta rsm/dt$ is calculated in steps 102, 110 and 112 with respect to the objects continuously detected from the previous process. After the above process is completed, the routine proceeds to step 164.

In step 164, it is determined whether or not the object (hereinafter referred to as a current object) currently being processed is the long distance object which is a long distance away from the vehicle 52. In step 164, an object having the relative distance RDi of more than 70 m is determined to be the long distance object. If it is determined that the current object is not the long distance object, the routine proceeds to step 166.

In step 166, is determined whether or not the current object is the short distance object which is a short distance away from the vehicle 52. In step 166, an object having the relative distance RDi of less than 30 m is determined to be the short distance object. If it is determined that the current object is not the short distance object, the routine proceeds to step 114. Accordingly, in the present embodiment, the middle distance object is subjected to the processed of step 114.

After step 114, the same process as the second embodiment is performed. With regard to the middle distance object, the result of determination as to whether the delay direction $\theta_{cent}FILT$ exists in the vehicle moving lane area accurately matches the fact whether the object exists in the vehicle moving lane. Thus, in the radar apparatus according to the present embodiment, it is accurately determined whether or not the middle distance object exists in the vehicle moving lane.

If it is determined, in step 168, that the current object is the short distance object exists in the vehicle moving lane, the routine proceeds to step 168.

In step 168, it is determined whether or not the change rate $d\theta rsm/dt$ of the blunted value $\theta_{cent}rsm$ with respect to the current object is equal to or greater than a predetermined value Thn. the predetermined value Thn is a value slightly smaller than the change rate dθrsm/dt which is obtained when the short distance object changes a lane or when the short distance object enters or exits a curve.

Accordingly, if it is determined that the above-mentioned relationship is not satisfied, it is determined that the object is not changing a lane or entering or exiting a curve. When such a determination is made in step 168, the routine proceeds to step 104 to perform the process to determine whether or not the current object satisfies the vehicle moving lane condition based on the delay direction $\theta_{cent}$FILT. On the other hand, if it is determined, in step 168, that the relationship dθrsm/dt≧Thn is satisfied, it is determined that the current object is changing a lane or entering or exiting a curve. In this case, the routine proceeds to step 170.

In step 170, it is determined whether or not the relationship of step 168 is continuously satisfied for a predetermined time period Tn. The predetermined time period Tn is a period of time which is shorter than a period during which the blunted value $\theta_{cent}$rsm is continuously changed when the short distance object changes a lane. Additionally, the predetermined time period Tn is longer than the period during which the blunted value $\theta_{cent}$rsm is continuously changed when the short distance object enters or exits a curve.

Accordingly, if it is determined that the above-mentioned relationship of step 170 is not satisfied, it is determined that the object is not entering or exiting a curve. Thus, when such a determination is made in step 170, the routine proceeds to step 104 to perform the process to determine whether or not the current object satisfies the vehicle moving lane condition based on the delay direction $\theta_{cent}$FILT. On the other hand, if it is determined, in step 170, that the relationship of step 168 dθrsm/dt≧Thn is continuously satisfied for the predetermined time period Tn, it is determined that the current object is changing a lane. In this case, the routine proceeds to step 172.

In step 172, it is determined whether or not the turning radius of the vehicle 52 is maintained to be approximately constant for a predetermined time period α sec after the relationship dθrsm/dt≧Thn is satisfied for the current object. The predetermined time period α sec is slightly longer than a time period necessary for the vehicle 52 to move the distance between the current object and the vehicle 52. When the current object is moving in the vehicle moving lane, the vehicle 52 is subjected to the same change which occurred in the current object before the predetermined time period has passed since the change occurred in the current object.

The condition of step 172 is determined not to be established when the predetermined time period α sec has not passed since the change satisfying the relationship dθrsm/dt≧Thn occurred or a change occurred in the turning radius of the vehicle 52 before the predetermined time period α sec has passed. Under such condition, a possibility of the current object existing in the vehicle moving lane cannot be denied. Thus, if it is determined that the condition of step 172 is not established, the routine proceeds to step 104 to perform the process to determine whether or not the current object satisfies the vehicle moving lane condition based on the delay direction $\theta_{cent}$FILT. On the other hand, if it is determined, in step 172, that the turning radius of the vehicle 52 is constant for the predetermined time period α sec, it is determined that the current object does not exist in the vehicle moving lane. In this case, the routine proceeds to step 174.

In step 174, the current object is excluded from the objects determined to exist in the vehicle moving lane, and the routine is ended. The objects determined to exist in the vehicle moving lane may be referred to as vehicle moving lane objects. In the above-mentioned process, the short distance object which has the blunted value subject to large changes and for a long period of time is immediately excluded from the vehicle moving lane objects. Thus, in the radar apparatus according to the present embodiment, the short distance object which changed a lane can be immediately excluded from the vehicle moving lane objects.

If it is determined, in step 164, that the current object is the long distance object, the routine proceeds to step 175. Then, in step 175, it is determined whether or not the current object was determined to be the vehicle moving lane object in the previous process. If it is determined that the current object was not determined to be the vehicle moving lane object, the routine proceeds to step 104 to perform the process to determine whether or not the current object satisfies the vehicle moving lane condition based on the delay direction $\theta_{cent}$FILT. On the other hand, if it is determined that the current object was determined to be the vehicle moving lane object in the previous process, the routine proceeds to step 176. Hereinafter, the long distance object which was determined to be the vehicle moving lane object in the previous process may be referred to as a vehicle moving lane long distance object.

In step 176, it is determined whether or not the change rate dθrsm/dt of the blunted value $\theta_{cent}$rsm with respect to the current object is equal to or greater than a predetermined value Thf. The predetermined value Thf is a value smaller than the change rate dθrsm/dt which occurs when the long distance object enters or exits a curve, and greater than the change rate dθrsm/dt which occurs when the long distance object changes a lane. Accordingly, if it is determined that the above-mentioned relationship is satisfied, it is determined that the current object, which is the long distance object, is entering or exiting a curve. In this case, the routine proceeds to step 178.

In step 178, it is determined whether or not the relationship of step 176 is continuously satisfied for a predetermined time period Tf. The predetermined time period Tf is a period of time which is slightly shorter than a period during which the blunted value $\theta_{cent}$rsm is continuously changed when the long distance object enters or exits a curve. Accordingly, if it is determined that the above-mentioned relationship of step 178 is satisfied, it is determined that the vehicle moving lane long distance object is entering or exiting a curve. In this case, the routine proceeds to step 180.

In step 180, a flag FTRAC is set to "1". The flag FTRAC is provided for indicating that a movement of the current object, which is the vehicle moving lane long distance object, entering or exiting a curve is recognized. Hereinafter, the movement of an object entering or exiting a curve may be referred to as curve movement. After the process of step 180 is completed, the routine proceeds to step 182.

In step 182, a value of a timer Tf is incremented. The timer Tf is provided for timing an elapsed time after "1" is set to the flag FTRAC, that is, after the curve movement is recognized for the vehicle moving lane long distance object. As will be described later, the value of the timer Tf is always reset to "0" while the flag FTRAC is set to "0". After the process of step 182 is completed, the routine proceeds to step 184.

In step 184, the current object is determined to be the vehicle moving lane object, and the routine is ended. As mentioned above, in this routine, the vehicle moving lane long distance object showing the curve movement is not subjected to the determination process based on the delay direction $\theta_{cent}$FILT, and is determined to be the vehicle moving lane object.

If the result of determination of step 176 or step 178 is negative, that is, if the current object, which is the vehicle moving lane long distance object, does not show the curve movement, the routine proceeds to step 186.

In step 186, it is determined whether or not the flag FTRAC is set to "1". When the curve movement is recognized for the current object prior to the execution of the process of step 186, the flag FTRAC has already been set to "1". Thus, in this case, it is determined that the flag FTRAC is equal to "1", and the routine proceeds to step 188.

In step 188, the timer Tf is incremented. Since the timer Tf is incremented each time the routine proceeds to step 182 or step 188, the value of the timer Tf corresponds to the elapsed time period after the curve movement was first recognized in the current object. After the process of step 188 is completed, the routine proceeds to step 190.

In step 190, it is determined whether or not the value of the timer Tf reaches a predetermined time period $\beta$. The predetermined time period $\beta$ is a period from the time when the long distance object reaches an entrance or exit of a curve to the time when the vehicle 52 reaches the entrance or exit of the curve and when the vehicle moving lane area is corrected to an area corresponding to a new turning radius. If it is determined, in step 190, that the relationship Tf$\geq\beta$ is not satisfied, it is determined that an appropriate correction to the vehicle moving lane area has not been performed yet. In this case, the routine proceeds to step 192 in which it is determined whether or not a predetermined change has occurred in the turning radius of the vehicle 52. In the present embodiment, when the turning radius of the vehicle 52 begins to change, the correction of the vehicle moving lane area is started. It is determined, in step 192, that the predetermined change has occurred in the turning radius when it is recognized that a change sufficient for correcting the vehicle moving lane to an appropriate area has occurred. Accordingly, if it is determined that the predetermined change has not occurred, it is determined that the vehicle moving lane area has not been corrected to an appropriate area. If such a determination is made, the routine proceeds to step 184.

According to the above-mentioned process, the vehicle moving lane long distance object is continuously recognized as the vehicle moving lane object without being subject to the determination process based on the delay direction $\theta_{cent}$FILT after the curve movement is recognized and until the predetermined time period $\beta$ has passed or until the predetermined change occurs in the turning radius of the vehicle 52. This is because if the object is subjected to the determination process based on the delay direction $\theta_{cent}$FILT, there is a possibility that the vehicle moving lane long distance object is excluded from the vehicle moving lane object after the vehicle moving lane long distance object entered or exited a curve. However, in the present embodiment, such an undesired process can be eliminated as discussed above. Thus, in the radar apparatus according to the present embodiment, a further accurate determination can be achieved as compared to the case where an establishment of the vehicle moving lane condition with respect to the vehicle moving lane long distance object is determined based on the delay direction $\theta_{cent}$FILT.

If it is determined that the flag FTRAC is not set to "$_1$" in step 186, or the relationship Tf$\geq\beta$ is satisfied in step 190, or the predetermined change has occurred in the turning movement of the vehicle 52 in step 192, the routine proceeds to step 194 and consequently to step 196. In step 194, the timer Tf is reset. IN step 196, the flag FTRAC is reset to "0". Thereafter, the routine proceeds to step 104 to perform the process to determine whether or not the current object satisfies the vehicle moving lane condition based on the delay direction $\theta_{cent}$FILT.

As discussed above, in the radar apparatus according to the present embodiment, the short distance object is excluded from the vehicle moving lane object immediately after the short distance object changed a lane, and also the vehicle moving lane long distance object is treated as the vehicle moving lane object during the predetermined period after the vehicle moving lane long distance object entered or exited a curve. Thus, the radar apparatus according to the present embodiment can achieve an automatic guided vehicle system with an accurate control.

A description will now be given, with reference to FIGS. 24 and 25, of a sixth embodiment of the present invention. A scan-type radar apparatus according to the sixth embodiment of the present invention has the same structure as that of the radar apparatus according to the first embodiment shown in FIG. 1. In the radar apparatus according to the sixth embodiment, the radar ECU 30 performs a routine according to a flowchart shown in FIGS. 24 and 25 instead of the control process according to the flowchart shown in FIG. 6, FIG. 11, FIG. 14, FIGS. 18 to 20 or FIGS. 22 and 23.

When a plurality of objects exist ahead of the vehicle 52 equipped with the radar apparatus shown in FIG. 1, a plurality of vehicle moving lane objects may be recognized. Among the vehicle moving lane objects, movement of the first object, which is closest to the vehicle 52, is most important.

When the curve movement is shown for the first object, an erroneous determination may be made that the first object moved from the vehicle moving lane to another lane. If such a determination is made under the condition where a plurality of objects exist ahead of the vehicle 52, one of the other object will be determined to be the first object. This may decrease controllability of the automatic vehicle guide system such that an unnecessary deceleration is performed. The present embodiment is characterized in that the above-mentioned erroneous determination of the first object is eliminated.

Figure 24:
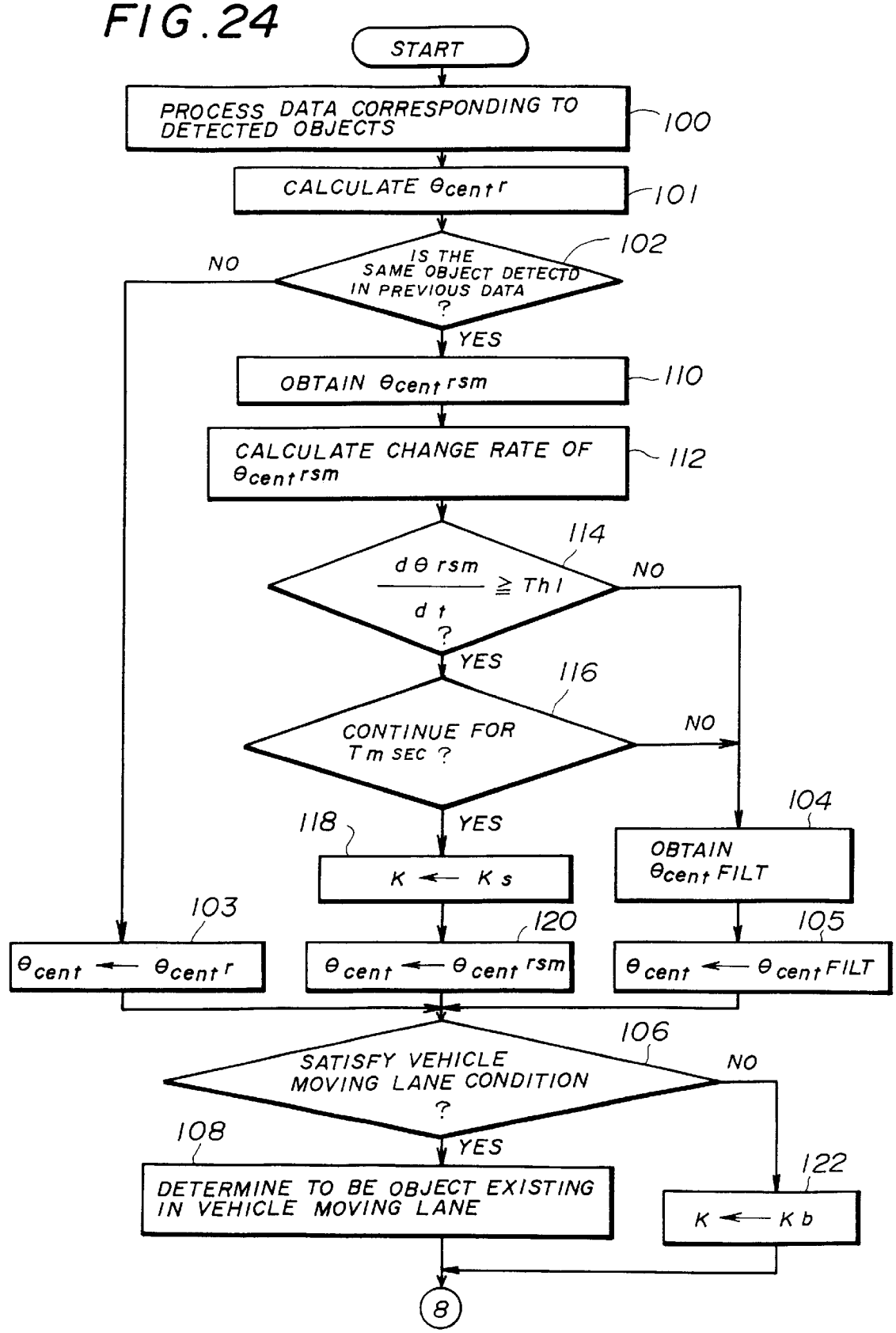
FIGS. 24 and 25 are parts of a control routine performed by the radar ECU of a radar apparatus according to a sixth embodiment of the present invention.
Figure 25:
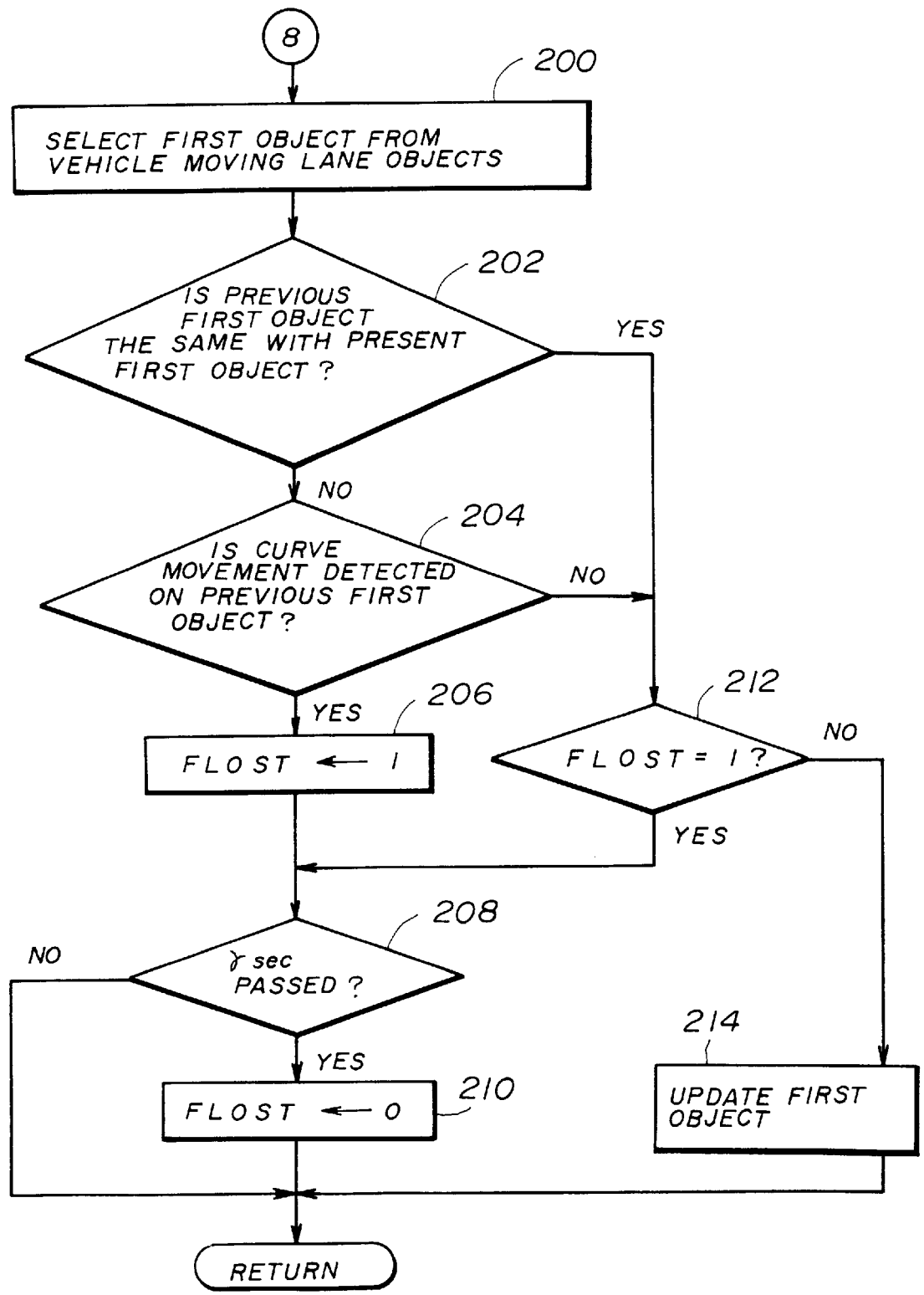

FIGS. 24 and 25 are parts of a flowchart of a control routine performed by the radar ECU 30. In FIGS. 24 and 25, steps that are the same as the steps shown in FIG. 11 are given the same reference numerals, and descriptions thereof will be omitted. The control routine shown in FIGS. 24 and 25 is started each time the radar antenna scans −10 degrees to +10 degrees.

When the control routine is started, the process of steps 100 to 122 is performed. That is, it is determined whether or not each of the detected objects anterior to the radar equipped vehicle 52 corresponds to the vehicle moving lane object. Thereafter, the routine proceeds to step 200 shown in FIG. 24.

In step 200, the first object is selected from among all of the objects determined to be the vehicle moving lane objects. In this step, the vehicle moving lane object which is closest to the vehicle 52 is selected as the first object. After the process of step 200, the routine proceeds to step 202.

In step 202, it is determined whether or not the object (hereinafter referred to as a previous first object) determined to be the first object in the previous process corresponds to the object (hereinafter referred to as a present first object) determined to be the first object in the present process. It is determined that the present first object corresponds to the previous first object when the relative distance RDi and the relative velocity RV of the previous first object do not significantly differ from those of the present first object.

If it is determined, in step 202, that the previous first object is not the same with the present first object, it is determined that there is a possibility that one of the vehicle moving lane objects other than the true first object was selected as the first object due to the previous first object being erroneously excluded from the vehicle moving lane object. In this case, the routine proceeds to step 204.

In step 204, it is determined whether or not the curve movement is detected for the previous first object. Specifically, the determination is preformed based on the condition used in steps 168 and 170 shown in FIG. 23 when the previous first object is the short distance object; the condition used in steps 176 and 178 shown in FIG. 23 when the previous first object is the long distance object; and the condition used in steps 114 and 116 when the previous first object is the middle distance object.

If it is determined, in step 204, that the curve movement is detected on the previous first object, it is determined that the possibility of erroneous exclusion of the previous first object is high. In this case, the routine proceeds to step 206.

In step 206, a flag FLOST is set to "1". The flag FLOST is provided for indicating that there is a high possibility of the previous first object being erroneously excluded from the vehicle moving lane objects. After the process of step 206 is completed, the routine proceeds to step 208.

In step 208, it is determined whether or not a predetermined time period $\tau$ sec has passed since the flag FLOST was set to "1". If it is determined that the period $\tau$ sec is has not been passed yet, the routine is ended. On the other hand, if it is determined that the period $\tau$ sec has been passed, the routine proceeds to step 210.

In step 210, the flag FLOST is reset to "0", and the routine is ended. In the above-mentioned process, the value of the flag FLOST is maintained to be "1" during the period $\tau$ sec after it is set to "1" in step 206.

If it is determined, in step 202, that the present first object is the same as the previous first object, or if it is determined, in step 204, that the curve movement is not detected on the previous first object, the routine proceeds to step 212.

In step 212, is determined that the flag FLOST is set to "1". If it is determined that the flag FLOST is set to "1", the routine proceeds to step 208. On the other hand, if it is determined that the flag FLOST is not set to "1", the routine proceeds to step 214.

In step 214, the first object is updated to the object selected in the present process. According to the above-mentioned process, the updating of the first object is permitted excluding the period $\tau$ sec after it is determined that there is a high possibility that the previous first object was erroneously excluded.

Accordingly, if it is determined that there is a high possibility that the previous first object is erroneously excluded from the vehicle moving lane objects, the first object is not permitted to be updated during the time period $\tau$ sec after the determination was made. Thus, the erroneous selection of the first object is prevented when the previous first object is erroneously excluded. This means that the erroneous determination of the first object being selected from other objects is eliminated when the first object enters or exits a curve.

The present invention is not limited to the specifically disclosed embodiments, and variations and modifications may be made without departing from the scope of the present invention.

What is claimed is:

1. A scan-type radar apparatus provided on a vehicle, the apparatus comprising:

a scan-type radar for detecting objects existing in a detectable range, said scan-type radar assuming a vehicle moving lane area corresponding to a vehicle moving lane in which said vehicle is moving based on an operating condition of said vehicle, said vehicle moving lane area being assumed within said detectable range;

object direction detecting means for detecting an actual direction of said each of the objects detected by said scan-type radar with respect to said vehicle;

delay direction calculating means for calculating a delay direction when the actual direction detected by said object direction detecting means is changed with respect to time, the delay direction indicating a direction of a virtual position of each of the objects with respect to said vehicle by being provided with a predetermined time delay with respect to change in the actual direction; and existence determining means for determining whether said each object exists within said vehicle moving lane by comparing the calculated delay direction of each object with the vehicle moving lane area;

wherein said delay direction calculating means comprises a blunted value calculating means for calculating a blunted value of the actual direction as the delay direction.

2. The scan-type radar apparatus as claimed in claim 1, wherein said blunted value is obtained from the actual direction being processed by a digital filter.

3. The scan-type radar apparatus as claimed in claim 1, further comprising change rate detecting means for detecting a change rate of the actual direction of said each of the objects, wherein said existence determining means comprises lane width changing means for decreasing a width of said vehicle moving lane area when the change rate exceeds a predetermined value.

4. The scan-type radar apparatus as claimed in claim 1, wherein said delay direction calculating means comprises delay amount setting means for providing the predetermined time delay to said each of the objects detected by said scan-type radar.

5. The scan-type radar apparatus as claimed in claim 1, further comprising correspondence determining means for determining whether the change in the actual direction of said each of the objects corresponds to each other, wherein said existence determining means comprises determination maintaining means for determining that one of the objects continuously exists in said vehicle moving lane when a shift in the actual direction of said one of the objects which has been determined to exist in said vehicle moving lane corresponds to a shift in the direction of at least another one of the objects.

6. The scan-type radar apparatus as claimed in claim 5, wherein said correspondence determining means comprises time difference assuming means for assuming a time difference between a start time of a shift in the actual direction of the objects based on each distance between the objects.

7. The scan-type radar apparatus as claimed in claim 1, further comprising excluding means for excluding a short distance object from the objects determined to exist in said vehicle moving lane when a shift in the actual direction of said short distance object has a change rate greater than a predetermined value for a predetermined time period, said short distance object being one of the objects positioned within a predetermined short distance from said vehicle in said vehicle moving lane.

8. The scan-type radar apparatus as claimed in claim 1, further comprising recognizing means for recognizing a long distance object as an object existing in said vehicle moving lane during a first predetermined time period, after a change has occurred in the direction of said long distance object with a continuous change rate of more than a predetermined value for a second predetermined time period, said long distance object being positioned beyond a predetermined long distance from said vehicle.

* * * * *